(12) United States Patent
Handte et al.

(10) Patent No.: US 11,050,507 B2
(45) Date of Patent: Jun. 29, 2021

(54) CODING AND MODULATION APPARATUS USING NON-UNIFORM CONSTELLATION

(71) Applicant: Sony Corporation, Tokyo (JP)

(72) Inventors: Thomas Handte, Stuttgart (DE); Dana Ciochina, Stuttgart (DE); Nabil Sven Loghin, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 14 days.

(21) Appl. No.: 16/487,840

(22) PCT Filed: Mar. 8, 2018

(86) PCT No.: PCT/EP2018/055844
§ 371 (c)(1),
(2) Date: Aug. 22, 2019

(87) PCT Pub. No.: WO2018/162686
PCT Pub. Date: Sep. 13, 2018

(65) Prior Publication Data
US 2020/0186283 A1    Jun. 11, 2020

(30) Foreign Application Priority Data
Mar. 9, 2017    (EP) .................................... 17160098

(51) Int. Cl.
*H04L 5/12*    (2006.01)
*H03M 13/11*    (2006.01)
*H04L 1/00*    (2006.01)

(52) U.S. Cl.
CPC .......... *H04L 1/0057* (2013.01); *H04L 1/0002* (2013.01); *H04L 1/0013* (2013.01); *H04L 1/0035* (2013.01); *H04L 1/0042* (2013.01)

(58) Field of Classification Search
None
See application file for complete search history.

(56) References Cited

U.S. PATENT DOCUMENTS 8,548,079 B2 * 10/2013 Wu ...................... H04L 27/3488
    375/261
9,036,694 B2 *  5/2015 Zhou .................... H04L 27/366
    375/240.01
(Continued)

FOREIGN PATENT DOCUMENTS

WO    2016/166188 A1    10/2016
WO    2017/005874 A1     1/2017

OTHER PUBLICATIONS

International Search Report and Written Opinion dated Jun. 1, 2018 for PCT/EP2018/055844 filed on Mar. 8, 2018, 14 pages.
(Continued)

*Primary Examiner* — Sithu Ko
(74) *Attorney, Agent, or Firm* — Xsensus LLP

(57) ABSTRACT

A coding and modulation apparatus and method are presented, particularly for use in a system according to IEEE 802.11. The apparatus comprises an encoder configured to encode input data into cell words according to an LDPC code and a modulator configured to modulate said cell words into constellation values of a non-uniform constellation and to assign bit combinations to constellation values of the used non-uniform constellation. The modulator is configured to use a non-uniform constellation and bit labeling from one of the several groups of constellations, which constellation show quadrant and octant symmetry.

14 Claims, 12 Drawing Sheets

(56) References Cited

U.S. PATENT DOCUMENTS

| | | | |
|---|---|---|---|
| 9,258,148 B2* | 2/2016 | Gatti | H04L 25/022 |
| 9,276,687 B1* | 3/2016 | Jeong | H04L 27/2602 |
| 9,413,577 B2* | 8/2016 | Shin | H04L 27/2601 |
| 9,729,174 B2* | 8/2017 | Myung | H03M 13/2792 |
| 9,748,975 B2* | 8/2017 | Jeong | H04L 1/0057 |
| 9,806,861 B2* | 10/2017 | Ko | H04L 5/0053 |
| 9,967,127 B1* | 5/2018 | Sun | H04L 27/3405 |
| 10,355,816 B2* | 7/2019 | Klenner | H04L 1/0071 |
| 10,587,357 B2* | 3/2020 | Myung | H03M 13/2906 |
| 2015/0229328 A1* | 8/2015 | Park | H03M 13/1185 |
| | | | 714/776 |

OTHER PUBLICATIONS

IEEE, "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", P802.11ay™/D0.2, Jan. 2017, pp. 1-179.

IEEE, "Potential of Non-Uniform Constellations with Peak Power Constraint", IEEE 802.11-15/0835r0, Jul. 2015, pp. 1-19.

Zoellner et al., "Optimization of High-order Non-uniform QAM Constellations", IEEE International Symposium on Broadband Multimedia Systems and Broadcasting 2013, 6 pages.

IEEE, "Part 11: Wireless LAN Medium Access Control (MAC) and Physical Layer (PHY) Specifications", IEEE Computer Society, IEEE Std 802.11ad™-2012, Dec. 28, 2012, pp. 1-598.

IEEE, "Part 11: Wireless LAN Medium Access Control (MAC) and Physical Layer (PHY) Specifications", IEEE Computer Society, IEEE Std 802.11™-2016, Dec. 7, 2016, pp. 1-3532.

\* cited by examiner

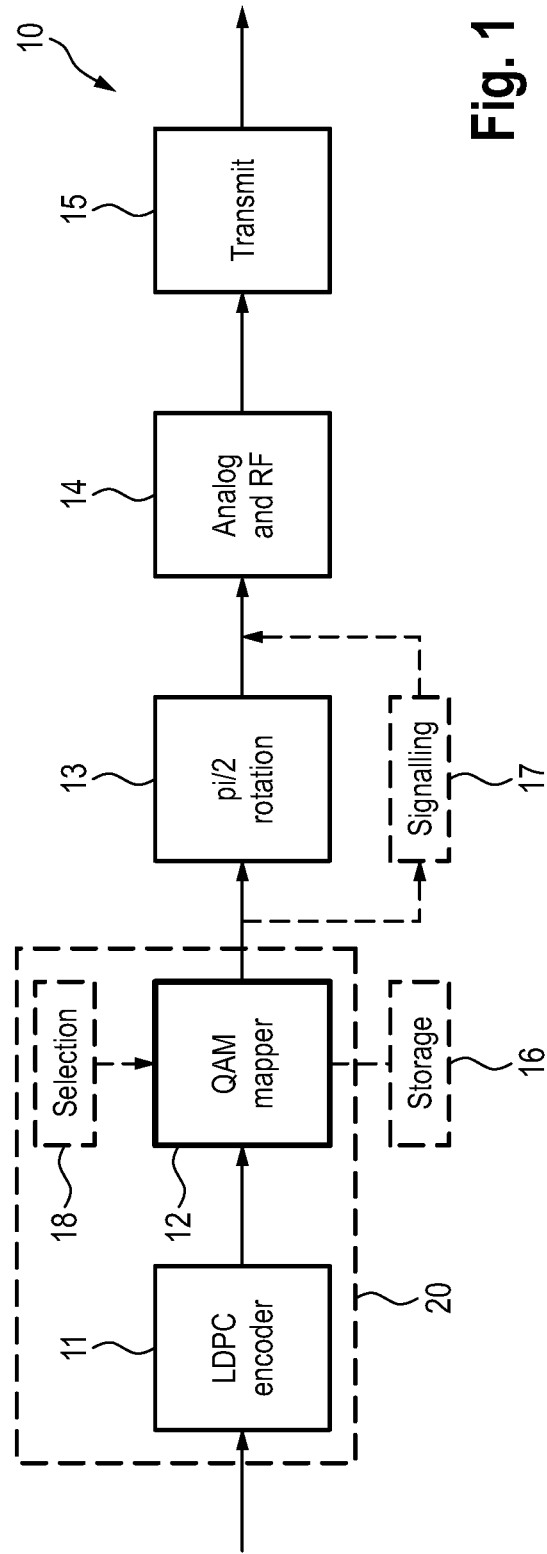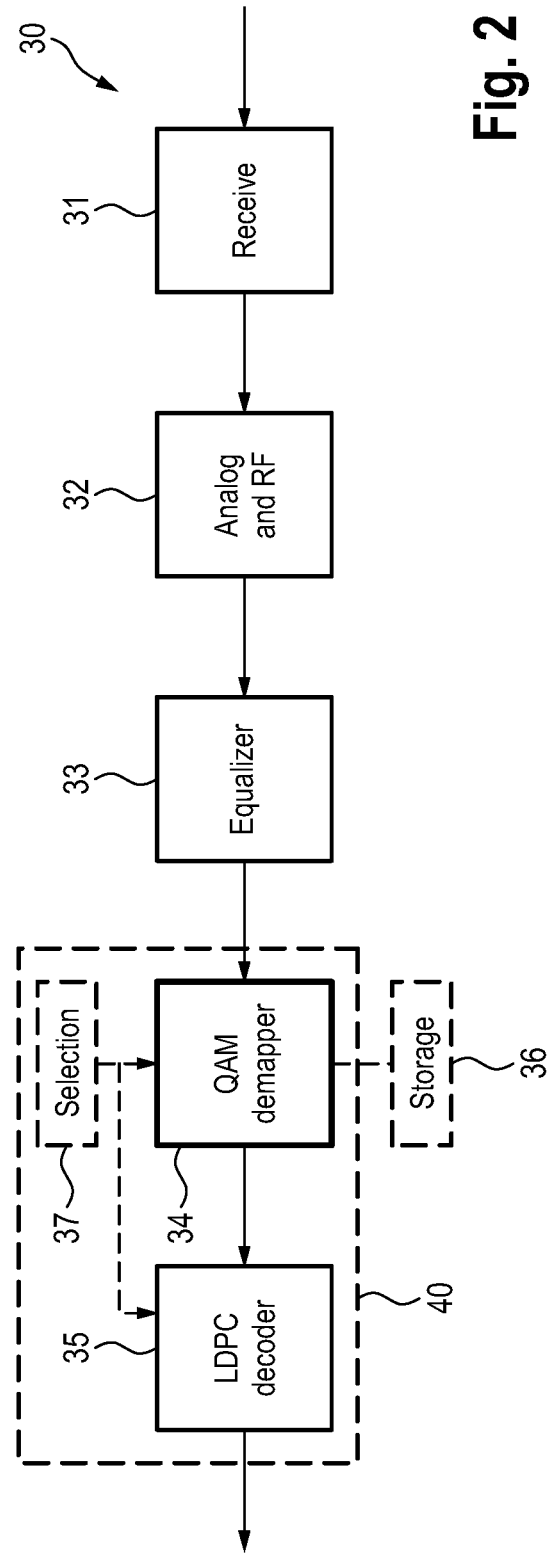

CODING AND MODULATION APPARATUS USING NON-UNIFORM CONSTELLATION

CROSS-REFERENCE TO RELATED APPLICATIONS

The present application is based on PCT filing PCT/EP2018/055844, filed Mar. 8, 2018, and claims priority to EP 17160098.4, filed Mar. 9, 2017, the entire contents of each are incorporated herein by reference.

BACKGROUND

Field of the Disclosure

The present disclosure relates to a coding and modulation apparatus and method as well as a demodulation and decoding apparatus and method. Further, the present disclosure relates to a transmission apparatus and method as well as a receiving apparatus and method. Still further, the present disclosure relates to a computer program and a nontransitory computer-readable recording medium.

Description of Related Art

Modern communications systems typically employ, among other elements, a coding and modulation apparatus (as part of a transmission apparatus) and a decoding and demodulation apparatus (as part of a receiving apparatus). The coding and modulation apparatus is often part of a so called BICM (Bit Interleaved Coded Modulation) apparatus, which generally comprises (at the transmitter side) a serial concatenation of a FEC (Forward Error Correction) encoder, a bit interleaver, and a modulator, which uses spectral efficient modulation such as BPSK (Binary Phase Shift Keying), QPSK (Quaternary Phase Shift Keying), or QAM (Quadrature Amplitude Modulation).

BICM allows for good performance due to the use of the interleaver and/or the FEC encoder. It has a reasonable decoding complexity as opposed to multilevel coding (MLC) coding schemes and is thus used frequently in communications systems, such as in all DVB systems (e.g. DVB-S2x), powerline communications (e.g., Homeplug AV), DAB, LTE, WiFi (IEEE 802.11), ATSC 3.0, etc.. The first generation of 60 GHz WLAN is specified in IEEE 802.11ad. Systems in accordance with IEEE 802.11ad use uniform constellations. Several Modulation and Coding Schemes (MCSs) are defined. Currently, there is a working group which investigates possible technologies for the next generation of the specification which will likely be called 802.11ay (or "next generation 60 GHz", due to the carrier frequencies of around 60 GHz).

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a coding and modulation apparatus and method providing an increased or even maximized coding and modulation capacity and a reduced bit error rate and reception with a reduced required SNR (signal-to-noise ratio) and, preferably providing a maximized gain, i.e. shaping gain, and/or increased robustness against phase noise. It is a further object to provide a demodulation and decoding apparatus and method as well as a corresponding computer program for implementing said methods and a nontransitory computer-readable recording medium for implementing said methods.

According to an aspect there is provided a coding and modulation apparatus comprising
  an encoder configured to encode input data into cell words according to a low density parity check code, LDPC, and
  a modulator configured to modulate said cell words into constellation values of a non-uniform constellation and to assign bit combinations to constellation values of the used non-uniform constellation,
  wherein said modulator is configured to use
  i) a non-uniform constellation and bit labeling from one of the following groups A-D and A'-D' of constellations or
  ii) a non-uniform constellation obtained from a constellation of the following groups AD and A'-D' of constellations through rotation by an angle around the origin, through inversion of bit labels for all constellation points, through interchanging of bit positions, through mirroring on any line in the complex plane and/or through predistortion for the constellation points,
  wherein the constellation points are defined by a constellation position vector $w_0 \ldots w_{N-1}$, and wherein the constellation position vectors of the different constellations.

According to a further aspect there is provided a transmission apparatus comprising:
  a coding and modulation apparatus configured to encode and modulate input data into constellation values,
  a converter configured to convert said constellation values into one or more transmission streams to be transmitted, and
  a transmitter configured to transmit said one or more transmission streams.

According to another aspect there is provided a demodulation and decoding apparatus comprising
  a demodulator configured to demodulate constellation values of a non-uniform constellation into cell words and to assign bit combinations to constellation values of the used non-uniform constellation, and
  a decoder configured to decode cell words into output data according to a low density parity check code, LDPC,
  wherein said demodulator is configured to use
  i) a non-uniform constellation and bit labeling from one of the following groups A-D and A'-D' of constellations or
  ii) a non-uniform constellation obtained from a constellation of the following groups AD and A'-D' of constellations through rotation by an angle around the origin, through inversion of bit labels for all constellation points, through interchanging of bit positions, through mirroring on any line in the complex plane and/or through predistortion for the constellation points,
  wherein the constellation points are defined by a constellation position vector $w_0 \ldots w_{N-1}$, and wherein the constellation position vectors of the different constellations.

According to a further aspect there is provided a receiving apparatus comprising
  a receiver configured to receive one or more transmission streams,
  a deconverter configured to deconvert one or more transmission streams into said constellation values, and
  a demodulation and decoding apparatus configured to demodulate and decode said constellation values into output data.

According to a further aspect there is provided another coding and modulation apparatus comprising
- an encoder configured to encode input data into cell words according to a low density parity check code, LDPC, and
- a modulator configured to modulate said cell words into constellation values of a non-uniform constellation and to assign bit combinations to constellation values of the used non-uniform constellation,
- wherein said modulator is configured to use
- i) a non-uniform constellation, wherein
- the constellation comprises 32, 64, 128 or 256 constellation points,
- the constellation points in each quadrant of the constellation diagram either have a mirror constellation point in the same quadrant mirrored at the π/4 or −π/4 axis or lie on the π/4 or −π/4 axis,
- the constellation points in each quadrant of the constellation diagram are symmetrical to the constellation points in all other quadrant,
- at least one signal point within the signal points having same magnitude has an unequal angular distance to the neighbors in direct vicinity in angular domain, and
- the Euclidean distance between two nearest neighboring constellation points in a quadrant is different for different pairs of nearest neighboring constellation points, or
- ii) a non-uniform constellation obtained from a constellation according to i) through rotation by an angle around the origin, through inversion of bit labels for all constellation points, through interchanging of bit positions, through mirroring on any line in the complex plane and/or through predistortion for the constellation points.

According to still further aspects corresponding methods, a computer program comprising program means for causing a computer to carry out the steps of the methods disclosed herein, when said computer program is carried out on a computer, as well as a nontransitory computer-readable recording medium that stores therein a computer program product, which, when executed by a processor, causes the methods disclosed herein to be performed are provided.

Preferred embodiments are defined in the dependent claims. It shall be understood that the claimed methods, the claimed computer program and the claimed computer-readable recording medium have similar and/or identical preferred embodiments as the claimed apparatus and as defined in the dependent claims.

One of the aspects of the disclosure is that the constellation points of the used constellations, called non-uniform constellations, are not located on a regular grid with equidistant symbols, but rather on optimized locations, e.g. dependent on the channel conditions between the transmission apparatus and a receiving apparatus with which the transmission apparatus wants to communicate (e.g. in a Wireless LAN network). Further, the used constellation is selected (preferably in advance, but generally on the fly in other embodiments) dependent on the code rate and the desired total number of constellation points of the used constellation. The code rate and total number of constellation points (also referred to as "modulation order") may depend among other parameters on the channel quality, such as signal-to-noise ratio. A method how to find and optimize these non-uniform constellations (in the following called NUCs) will be explained below. Further, for the proposed non-uniform constellations a bit labelling (i.e. an assignment of bit combinations to constellation values of the used non-uniform constellation) is proposed.

Generally, the coding and modulation capacity, such as the BICM capacity in systems using a BICM apparatus, is considered as a target function, and it is desired to find optimum constellation points such that this capacity is maximized and/or phase noise power are simultaneously applied, often subject to a power normalization, i.e., the average power of the constellation points should be normalized to e.g. 1.

The disclosed NUCs feature a maximum peak power and are optimized for maximum BICM capacity (shaping gain) with three constraints, namely an average power constraint, and a phase noise power constraint. Those NUCs may be mainly suitable for single carrier (SC) modulation where phase noise results in an angular dispersion of the signal points. Therefore, the present disclosure proposes a NUC design with and without phase noise power consideration. The disclosed NUCs offer a threefold benefit compared to state-of-the-art uniform constellations: a shaping gain, and improved robustness against phase noise.

In the tables presented herein various constellations are provided for different code rates R. It should be noted that the code rate R indicated in the tables are not to be understood such that a particular constellation is only valid for exactly this code rate, but also for slightly different code rates. The code rate as indicated in a modulation and coding scheme (MCS) index might differ from the true code rate of the system, e.g. because of padding and other constraints related to the frame structure.

It should also be noted that one or more of the following "invariant trans-formations" do not affect the properties of the constellations:
1. rotation of all symbols by an arbitrary angle φ,
2. inversion of m-th bit y_m=b∈{0,1} to y_m=−b, where the bar indicates inversion,
3. interchanging of bit positions y_k1 and y_k2,
4. reflection on Re{xl}- and/or Im{xl}-axis,
5. predistortion,
6. mirroring on any line in the complex plane.

Thus, the modulator may also use a non-uniform constellation obtained from a constellation from anyone of groups A-D and A'-D' through rotation by an angle around the origin, an inversion of bit labels for all constellation points, an interchanging of bit positions for all constellation points and/or a reflection on the real part and/or imaginary part axis. For instance, if one constellation point has bit labels 000010 for 64-QAM, all first bit labels can be inverted such that this point becomes 111010. Further, constellation obtained through any other trivial manipulation, such as rounding of the constellation points' positions shall generally be covered by the claims. Through one or more of these operations an equivalent mapping to the mapping of the constellations defined in the above mentioned groups is achieved.

In summary, this disclosure proposes signal points of NUCs which feature quadrant and octant symmetry. The disclosed NUCs may further be distinguished between NUCs optimized for AWGN channel and NUCs optimized for AWGN and phase noise channel. The NUCs optimized for AWGN achieve maximum capacity in AWGN channel, while the NUCs optimized for AWGN and phase noise achieve optimum performance in phase noise channels. Optimum performance is achieved if a NUC is operated at a particular code rate for which it is optimized. However, NUCs can generally also be applied for different code rates.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIG. 1 shows a schematic diagram of an embodiment of a transmission apparatus according to the present disclosure, FIG. 2 shows a schematic diagram of an embodiment of a receiving apparatus according to the present disclosure.

DETAILED DESCRIPTION OF THE EMBODIMENTS

Figure 3:
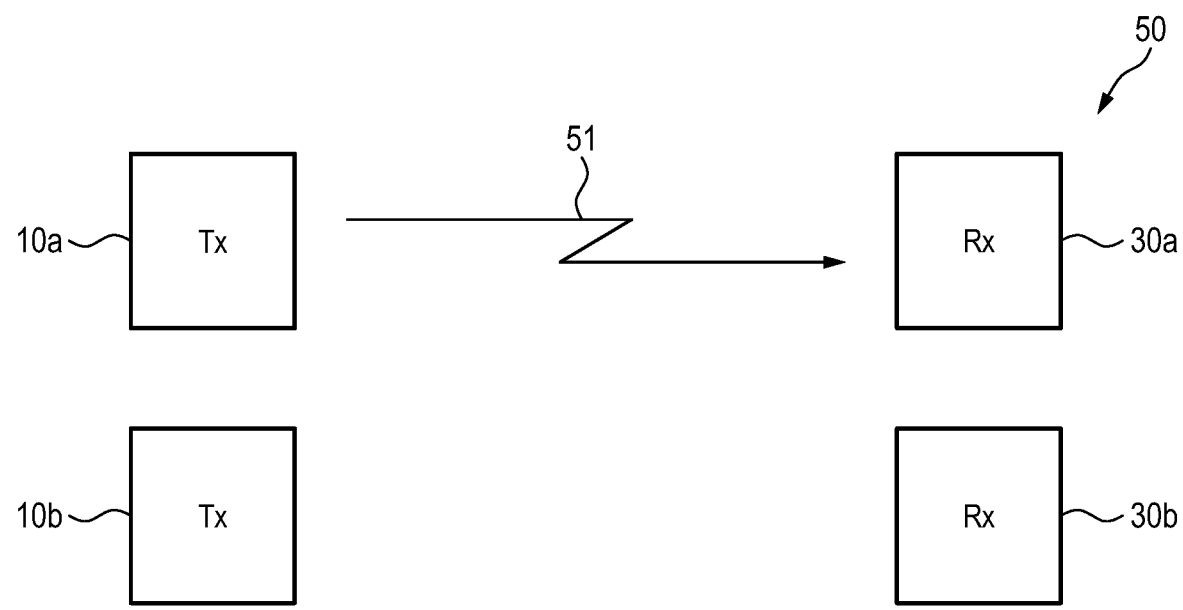
FIG. 3 shows a schematic diagram of an embodiment of a communications system according to the present disclosure.

Recently, single carrier (SC) modulation becomes again attractive for communication schemes and is considered in standards like DTMB and WLAN 802.11ad. The reason behind comprises the advance in research of efficient SC equalizer designs and a higher power efficiency for power amplifiers which increases battery lifetime of portable devices.

In the following, NUCs as well as corresponding architectures of a transmitting apparatus and a receiving apparatus will be explained which are preferably, but not exclusively used in SC communication schemes.

Another difference between MC and SC communication schemes consists in the effect of phase noise (PN). In MC communication schemes PN results in a common phase error (CPE) as well as additional AWGN (additive white Gaussian noise). Since NUCs are designed for maximum BICM capacity in an AWGN channel and the CPE can be compensated at the receiver side, by exploiting commonly available pilot carriers, no further optimizations are required for NUCs in MC communications. However, in SC communications, PN leads to an angular dispersion of the signal points, i.e. the signal points are randomly rotated around the origin of the complex plane. As this noise effect is clearly different from AWGN which leads to a similar dispersion of real and imaginary part of the signal points (circular symmetric complex noise), it is required to be considered in the optimization of NUCs. This is particularly important to communication systems in 60 GHz frequency range because PN is rather strong compared communication schemes operating in lower frequencies.

Furthermore, some communication systems such as 802.11ad/ay feature a continous pi/2 rotation, i.e. the signal points at the QAM mapper output s(k) at point in time k are rotated according to $$\tilde{s}(k) = s(k) \cdot e^{j\frac{\pi}{2}k}.$$

At the receiver side, this operation needs to be either reversed or bit labels need to be swapt. Prerequiste for the latter approach is that signal points are invariant with respect to a pi/2 rotation which is equivalent of a signal point symmetry at ±pi/4 axes within a quadrant (also referred as ocatant symmetry). This is typically not fulfilled by NUCs and in particular addressed by this disclosure. Quadrant symmetry of signal points in the sense of a mirroring at the axes of constellation diagram in not sufficient to address the problem.

The present disclosure this disclosure proposes signal points of NUCs with feature quadrant and octant symmetry. It may further be differentiated between NUCs optimized for AWGN channel and NUCs optimized for AWGN and phase noise channel. Those optimized for AWGN achieve maximum capacity in AWGN channel, while those optimized for AWGN and phase noise achieve optimum performance in phase noise channels. In each category, different NUCs are proposed which are preferably (but not exclusively) applicable for a particular code rate (i.e. code rate 5/8, 3/4, 13/16, 7/8). Optimum performance is achieved if the NUCs are operated at the design code rate. However, NUC can also be applied for different code rates.

FIG. 1 shows an embodiment of a transmission apparatus 10 according to the present disclosure including an embodiment of a coding and modulation apparatus 20 according to the present disclosure for use with SC modulation. The transmission apparatus 10 comprises an FEC (forward error correction) encoder 11 for encoding the input data by use of a coding algorithm, e.g. and LDPC (low density parity check) code, and a certain code rate, which is the ratio of number of incoming and outgoing bits. The code rate may depend on an MCS (modulation and coding scheme) index, which is generally predetermined or selected.

The transmission apparatus 10 further comprises a constellation mapper 12 (generally also called modulator), in particular a QAM (quadrature amplitude modulation) mapper, that maps the encoded bits of the input data to complex symbols (also called constellation points) in a constellation, in particular a QAM constellation. The modulation order (i.e. the number N of constellations points of the constellation, which corresponds to the number of bits mapped to a single QAM symbol) may also depend on the MCS index and is variable as well. The constellation diagram depicts all possible signal points within a complex plane.

The transmission apparatus 10 further comprises an optional pi/2 rotation unit 13 that introduces a pi/2 rotation, which improves the RF properties of the transmit signal. The pi/2 rotation has no influence on the BICM performance and is therefore generally not relevant to the NUC performance and optimization.

The transmission apparatus 10 further comprises an RF processing unit 14 for RF processing like frequency up-conversion, power amplifier, transmit filters, digital-to-analog conversion, etc., and a transmit unit 15 for transmitting the finally obtained signals over a channel to a receiving apparatus. In other embodiments of the transmission apparatus 10 additional elements may be provided, such as an input processing unit, or other elements as e.g. conventionally used in a transmission apparatus of a system in accordance with IEEE 802.11ad and 802.11ay.

The FEC encoder 11 and the constellation mapper (modulator) 12 are often summarized as BICM (bit-interleaved coded modulation) apparatus and represent the coding and modulation apparatus 20 according to the present disclosure. The FEC encoder 11 generally encodes input data into cell words, preferably according to an LDPC code (and optionally in accordance with a BCH code in addition). The modulator 12 generally modulates said cell words into constellation values of a non-uniform constellation and assigns bit combinations to constellation values of the used non-uniform constellation. Generally, the output of the FEC encoder 11 is referred to as a codeword (e.g. a couple of hundred bits), which are then divided into "tuples" (of e.g. 4 bits in case of 16-QAM), referred to also as cell words (of the codeword). These tuples (cell words) are then assigned to the constellations points by the modulator 12.

Based on the total number N of constellation points of the constellation (i.e. the modulation order) and the code rate R, one of a selection of non-uniform constellations of different groups is used. Details of those different groups of constellations will be explained in more detail below. The constellations and the constellations values are generally predetermined and e.g. stored in a constellations storage 16 or retrieved from an external source. The total number N and the code rate R, which may optionally be indicated by MCS parameters, may also be stored in the constellations storage 16 or the external source.

FIG. 2 shows an embodiment of a corresponding receiving apparatus 30 according to the present disclosure including an embodiment of a decoding and demodulation apparatus 40 according to the present disclosure. Basically, the same blocks of the transmission apparatus are reversed. After reception by a receiving unit 31, RF processing like frequency down-conversion, receive filtering, analog-to-digital conversion, etc. is performed by an RF unit 32. An equalizer 33 reverses the effect of channel distortions and forwards the equalized QAM symbols to the QAM demapper 34 (also called demodulator) for QAM demapping. Finally, decoding, e.g. LDPC decoding, is performed in a FEC decoder 35. In other embodiments of the receiving apparatus 30 additional elements may be provided, such as an output processing unit and/or a deframing unit, or other elements as e.g. conventionally used in a receiving apparatus of a system in accordance with IEEE 802.11ad and 802.11ay.

The QAM demapper 34 (demodulator) and the FEC decoder 35 are often summarized as BICM demodulation apparatus and represent the decoding and demodulation apparatus 40 according to the present disclosure. The demodulator 34 generally demodulates received constellation values of a non-uniform constellation into cell words, whereby bit combinations are assigned to constellation values of the used non-uniform constellation. In an embodiment, based on signalling information included in the received data the receiving apparatus 30 knows which one of a selection of non-uniform constellations of different groups has been used by the transmission apparatus 10 so that the receiving apparatus 30 can use the same non-uniform constellation for demodulation. The FEC decoder 35 generally decodes the cell words into output words. Also in the receiving apparatus 30 the constellations and the constellations values may be stored in a constellations storage 36 or retrieved from an external source.

The demodulation and decoding may consider soft values as opposed to hard decided values (0 and 1). Soft values represent the continuously distributed received values (possibly after A/D conversion including quantization) by more than two states (as in the case of binary (hard) decision). The reason is that for hard decision, the non-uniform constellations are generally not optimal. Nowadays, BICM receivers typically are soft receivers anyway.

FIG. 3 shows an embodiment of a communications system 50 according to the present disclosure comprising one (or more) transmission apparatus 10a, 10b (Tx), which may be a transmission apparatus 10 as shown in FIG. 1, and one or more receiving apparatus 30a, 30b (Rx), which may be a receiving apparatus 30 as shown in FIG. 2. As an example, the transmission apparatus 10a, which may be a WiFi access point or WiFi router, communicates with a receiving apparatus 30a, which may be a user device like a smartphone, laptop or tablet, via a bi-directional communication channel 51, for instance to provide access to the internet to the receiving apparatus 30a. Both the transmission apparatus 10a, 10b and the receiving apparatus 30a, 30b may use the ideas of the present disclosure in said communication session.

Today's systems in accordance with IEEE 802.11ad (WLAN, WiFi) generally use uniform constellations. Several Modulation and Coding Schemes (MCSs) are often defined for use in such systems. According to the present disclosure, non-uniform constellations are proposed, which are optimized with respect to coding and modulation capacity. One or more of these constellations may be used in systems in accordance with IEEE 802.11, particularly in accordance with versions like IEEE 802.11ad or upcoming versions such as IEEE 802.11ay.

The parameters of the basic MCSs for a transmitting apparatus are given in IEEE 802.11ad. The MCS index as described above defines the QAM modulation order (indicating the value of N) and the used code rate R. The receiver needs to know which MCS index (or, alternatively, modulation order N and code rate R) is used at transmitter side for correct decoding. Hence, in an embodiment the transmission apparatus 10 therefore signals the used MCS index (or, alternatively, which PHY mode, modulation order and code rate R). This signalling may be done at the beginning of each transmitted frame. For instance, this signalling information may be carried at the beginning of the frame in a special signal field. An example of a field which may be used is the HEADER field. For inserting such signalling information a transmitter signalling unit 17 may be provided in the transmission apparatus 10.

In another embodiment the transmission apparatus 10 may optionally comprise a selection unit 18, shown with dashed lines in FIG. 1, which selects the MCS index (or the respective parameters indicated by the MCS index) depending on the channel conditions to the receiving apparatus 30. For bad channel conditions a small MCS index (i.e. small N and/or small R) is selected (lower throughput but also smaller error probability), for good channel conditions a higher MCS index (i.e. higher N and/or higher R) is selected (higher throughput but also more prone to bit errors).

In other embodiments no such selection unit 18 is provided, but the transmission apparatus 10 uses one of the disclosed non-uniform constellations.

Figure 4B:
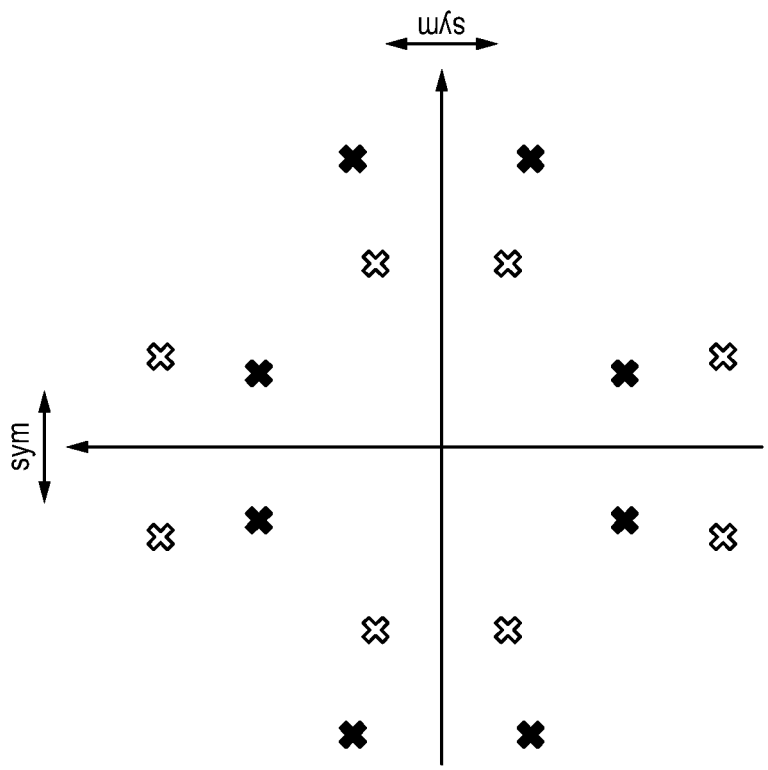
FIG. 4 shows a diagram of an exemplary regular two-dimensional non-uniform constellation without pi/4 symmetry.
Figure 4A:
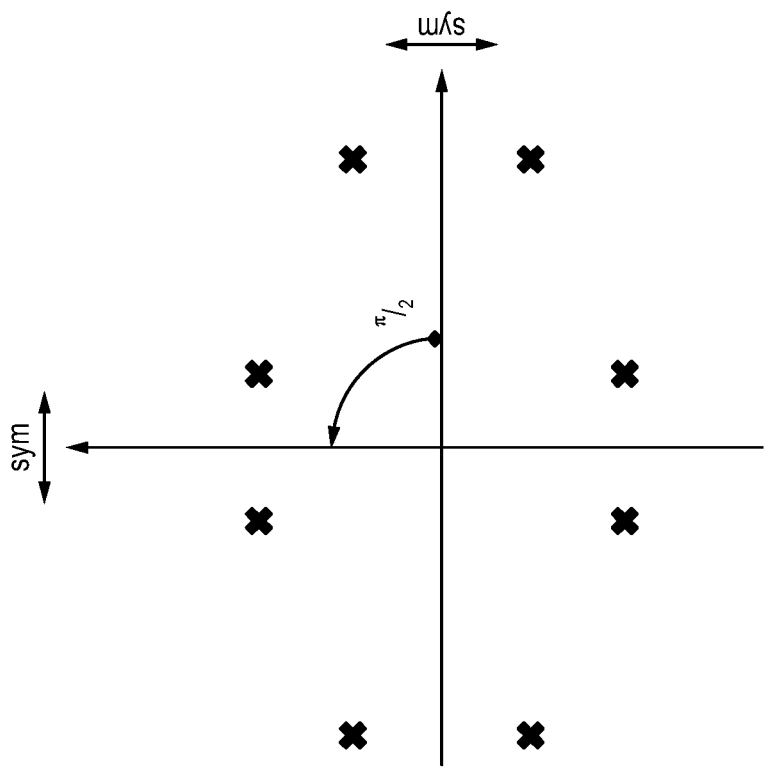
Figure 5:
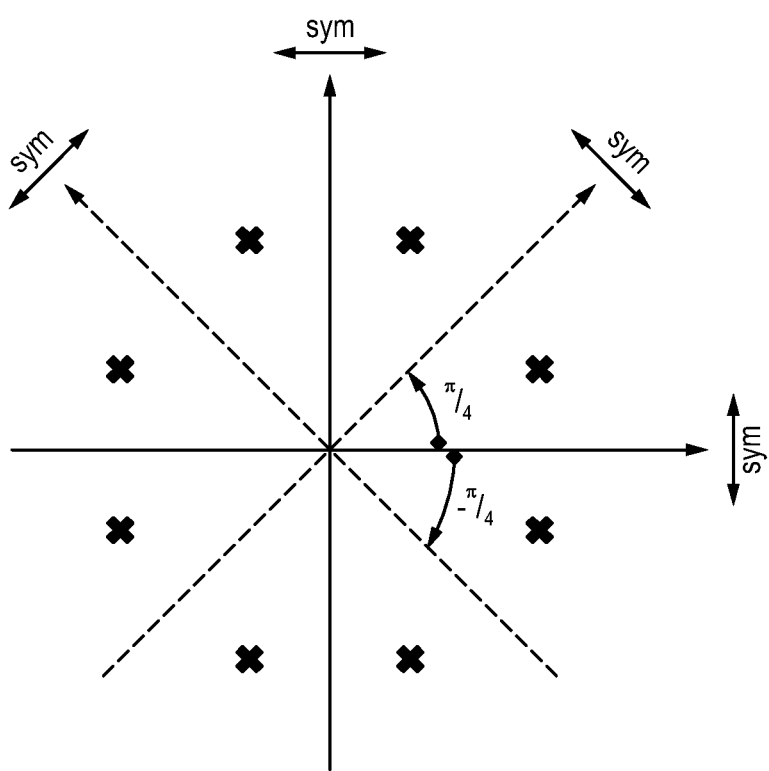
FIG. 5 shows a diagram of an exemplary two-dimensional non-uniform constellation according to the present disclosure with pi/4 symmetry.

In an embodiment the receiving apparatus 30 may optionally comprise a selection unit 37 as well, shown with dashed lines in FIG. 2, which selects the MCS index (or the respective parameters indicated by the MCS index) depending on the signalling information signalled by the transmission apparatus 10, FIG. 4A shows an example of a (regular) NUC featuring quadrant symmetry prior to pi/2 rotation and FIG. 4B shows the NUC shown in FIG. 4A after pi/2 rotation. FIG. 5 shows a NUC according to the present disclosure featuring symmetry at ±pi/4 axes (octant symmetry) in addition to quadrant symmetry prior to the pi/2 rotation. Since the regular NUC shown in FIG. 4A lacks the octant symmetry, new signal points are generated by the pi/2 rotation as shown in FIG. 4B. In contrast, the NUC shown in FIG. 5 stays invariant with respect to the pi/2 rotation, i.e. signal points prior and after pi/2 rotation are equal.

The NUC optimization for obtaining NUCs as used according to the present disclosure is as follows: Let $w_i$ be a signal point of a constellation diagram. All $w_i$ of a NUC are within the symbol vector W. The vector W has size N, i.e. there are N signal points in total. Furthermore, the average power $P=1/N\Sigma_{i=1}^{N}|W_i|^2$ is set to unity (without loss of generality), i.e. P=1. Further, it is assumed that the receiver may be affected by PN with variance $\sigma_\theta^2$. The function $cap(W,\gamma,\sigma_\theta^2)$ computes the BICM capacity of a symbol vector W in presence of PN which is a function of the actual signal to noise ratio (SNR) $\gamma$ of AWGN as well as $\sigma_\theta^2$. The BICM capacity in presence of PN is maximized with consideration of the average power constraint and the ±pi/4 symmetry constraint of W:

$$c_{opt}(\gamma, \sigma_\theta^2) = \max_{W}\{cap(W, \gamma, \sigma_\theta^2)\}$$

with the constraints P=1 and ±pi/4 symmetry of W. Here, the ±pi/4 symmetry is newly introduced. Mathematically the ±pi/4 symmetry can be defined by:

$$\forall w \in W : \text{Im}\{w\} + j \cdot \text{Re}\{w\} \in W$$

This means that for any w which is part of the signal constellation W, there exists at least one signal point which has real and imaginary part of w interchanged. Geometrically speaking this means that any w has either a partner $\tilde{w}$ which is obtained by mirroring at the pi/4 or –pi/4 axis or it is located on the pi/4 or –pi/4 axis. In principle, $C_{opt}(\gamma,\sigma_\theta^2)$ can be determined for every desired $\gamma$ and $\sigma_\theta^2$. Usually, the PN variance $\sigma_\theta^2$ is determined by the applied oscillators on transmitter and receiver side and $\gamma$ is determined by the communication system configuration (e.g. constellation size, code rate, channel code, etc.) and operating point.

As an implementation example, NUCs are proposed, preferably (but not exclusively) for use in IEEE 802.11ay compliant systems (i.e. next generation 60 GHz WLAN systems) which are suitable for either the AWGN channel (i.e. $\sigma_\theta^2=0$) for optimization or the AWGN and phase noise channel (i.e. $\sigma_\theta^2>0$). Those NUCs are adapted to the particular LDPC code and code rates of WLAN. The target SNR y is determined at a target FER of $10^{-2}$ for a UC (uniform constellation) with same number of constellation points N. Table 1 gives an overview of the considered modulation and coding schemes (MCS) and the corresponding N, code rate, $\gamma$, and optimization criterion. The PN variance $\sigma_\theta^2$ is set to an agreed value within the 802.11ay task group for the AWGN+PN case.

TABLE 1

| MCS | N | Code rate | γ [dB] | Optimized for |
|---|---|---|---|---|
| A | 64 | 5/8 | 15.0 | AWGN |
| B | 64 | 3/4 | 17.2 | AWGN |
| C | 64 | 13/16 | 18.5 | AWGN |
| D | 64 | 7/8 | 19.7 | AWGN |
| A' | 64 | 5/8 | 15.0 | AWGN + PN |
| B' | 64 | 3/4 | 17.2 | AWGN + PN |

TABLE 1-continued

| MCS | N | Code rate | γ [dB] | Optimized for |
|---|---|---|---|---|
| C' | 64 | 13/16 | 18.5 | AWGN + PN |
| D' | 64 | 7/8 | 19.7 | AWGN + PN |

It should be noted that the MCS index in Table 1 is not related to the MCS index in the published IEEE 802.11ad amendment. Further, the same NUC may be used for different MCS indices (e.g. the constellation points defined for MCS A may be used for both MCS A and MCS B (or other MCS indices) to reduce the overall number of NUCs), in particular for different code rates.

The selection unit 18 may be configured to select the code rate R based on channel conditions between a transmission apparatus including said coding and modulation apparatus and a receiving apparatus with which said transmission apparatus seeks to communicate. The selection unit 18 may select a constellation with a higher code rate R the better the channel conditions are.

The corresponding signal constellations and bit labelling for every MCS are given below. The NUCs are fully described by the complex valued signal point and the corresponding bit label. It should be noted that bit positions may be inverted, i.e. the bits of any bit position of the bit labelling may be flipped, resulting in the same performance. Moreover, the bit labelling is exemplary in the sense that bit positions may be interchanged. An interchange of bit positions may be beneficial for optimizing the NUCs to a particular FEC scheme. Furthermore, an optional predistortion unit may map the amplitude levels of the given NUC signal points to different amplitude levels. This can be beneficial when power amplifiers with non-linear transfer characteristic (beside a maximum output power) are applied. In other words, the present disclosure does not only relate to the NUCs as explicitly given in the following tables, but also relates to NUCs obtained from these NUCs through rotation by an angle around the origin, through inversion of bit labels for all constellation points, through interchanging of bit positions, through mirroring on any line in the complex plane and/or through predistortion for the constellation points. An example for column-wise inversion of the first bit (which affects all bit labels) would be:

w0 00→10
w1 01→11
w2 10→00
w3 11→01

Further, the signal points are represented with 4 decimal places in the following tables. The values may also be rounded e.g. 2 or 3 decimal places, which rounded values shall also be covered by the present disclosure. In particular, rounding in binary number representation is advantageous, i.e. rounding to integer multiples of $2^{-n}$ value with n being an integer number.

The selection unit 18 may be configured to select the code rate R based on channel conditions between a transmission apparatus including said coding and modulation apparatus and a receiving apparatus with which said transmission apparatus seeks to communicate. The selection unit 18 may select a constellation with a higher code rate R the better the channel conditions are.

As shown in the following, two-dimensional NUCs are proposed including constellation points and bit labelling. The constellation points, i.e., coordinates in the complex plane, use the notation according to which a first column defines the w vector and the second column describes the bit labelling of the constellation points in the following columns (for different MCS indices), wherein i=sqrt(−1) (or more precisely $i^2=-1$) is the imaginary unit.

According to the present disclosure a non-uniform constellation and bit labeling from one of the following groups A-D and A'-D' of constellations may be used, wherein the constellation points are defined by a constellation position vector $w_0 \ldots w_{N-1}$, and wherein the constellation position vectors of the different constellations are defined as follows:

a) Non-Uniform Constellations of Groups A-D:

| w | bit label | MCS A | MCS B | MCS C | MCS D |
|---|---|---|---|---|---|
| w0 | 000000 | 0.9016 + 0.5974i | 0.5815 + 1.1427i | 0.5756 + 1.1369i | 0.5718 + 1.1323i |
| w1 | 000001 | 1.0353 + 0.2i | 0.4117 + 0.1362i | 0.421 + 0.1444i | 0.4239 + 0.1471i |
| w2 | 000010 | 1.2336 + 0.8212i | 0.4313 + 0.7216i | 0.4462 + 0.7457i | 0.452 + 0.7592i |
| w3 | 000011 | 1.4364 + 0.2832i | 0.4156 + 0.4156i | 0.4351 + 0.4351i | 0.4455 + 0.4455i |
| w4 | 000100 | 0.6264 + 0.4312i | 0.1654 + 1.0365i | 0.1697 + 1.0341i | 0.1711 + 1.0327i |
| w5 | 000101 | 0.704 + 0.1656i | 0.1346 + 0.1346i | 0.1404 + 0.1404i | 0.1406 + 0.1406i |
| w6 | 000110 | 0.2679 + 0.1344i | 0.1428 + 0.7103i | 0.1456 + 0.7148i | 0.1483 + 0.7168i |
| w7 | 000111 | 0.4136 + 0.129i | 0.1362 + 0.4117i | 0.1444 + 0.421i | 0.1471 + 0.4239i |
| w8 | 001000 | 0.5974 + 0.9016i | 1.022 + 1.022i | 1.0146 + 1.0146i | 1.0128 + 1.0128i |
| w9 | 001001 | 0.2 + 1.0353i | 0.7103 + 0.1428i | 0.7148 + 0.1456i | 0.7168 + 0.1483i |
| w10 | 001010 | 0.8212 + 1.2336i | 0.743 + 0.743i | 0.7617 + 0.7617i | 0.7688 + 0.7688i |
| w11 | 001011 | 0.2832 + 1.4364i | 0.7216 + 0.4313i | 0.7457 + 0.4462i | 0.7592 + 0.452i |
| w12 | 001100 | 0.4312 + 0.6264i | 0.22 + 1.4139i | 0.2138 + 1.3886i | 0.2104 + 1.3777i |
| w13 | 001101 | 0.1656 + 0.704i | 1.0365 + 0.1654i | 1.0341 + 0.1697i | 1.0327 + 0.1711i |
| w14 | 001110 | 0.1344 + 0.2679i | 1.1427 + 0.5815i | 1.1369 + 0.5756i | 1.1323 + 0.5718i |
| w15 | 001111 | 0.129 + 0.4136i | 1.4139 + 0.22i | 1.3886 + 0.2138i | 1.3777 + 0.2104i |
| w16 | 010000 | 0.9016 − 0.5974i | 0.5815 − 1.1427i | 0.5756 − 1.1369i | 0.5718 − 1.1323i |
| w17 | 010001 | 1.0353 − 0.2i | 0.4117 − 0.1362i | 0.421 − 0.1444i | 0.4239 − 0.1471i |
| w18 | 010010 | 1.2336 − 0.8212i | 0.4313 − 0.7216i | 0.4462 − 0.7457i | 0.452 − 0.7592i |
| w19 | 010011 | 1.4364 − 0.2832i | 0.4156 − 0.4156i | 0.4351 − 0.4351i | 0.4455 − 0.4455i |
| w20 | 010100 | 0.6264 − 0.4312i | 0.1654 − 1.0365i | 0.1697 − 1.0341i | 0.1711 − 1.0327i |
| w21 | 010101 | 0.704 − 0.1656i | 0.1346 − 0.1346i | 0.1404 − 0.1404i | 0.1406 − 0.1406i |
| w22 | 010110 | 0.2679 − 0.1344i | 0.1428 − 0.7103i | 0.1456 − 0.7148i | 0.1483 − 0.7168i |
| w23 | 010111 | 0.4136 − 0.129i | 0.1362 − 0.4117i | 0.1444 − 0.421i | 0.1471 − 0.4239i |
| w24 | 011000 | 0.5974 − 0.9016i | 1.022 − 1.022i | 1.0146 − 1.0146i | 1.0128 − 1.0128i |
| w25 | 011001 | 0.2 − 1.0353i | 0.7103 − 0.1428i | 0.7148 − 0.1456i | 0.7168 − 0.1483i |
| w26 | 011010 | 0.8212 − 1.2336i | 0.743 − 0.743i | 0.7617 − 0.7617i | 0.7688 − 0.7688i |
| w27 | 011011 | 0.2832 − 1.4364i | 0.7216 − 0.4313i | 0.7457 − 0.4462i | 0.7592 − 0.452i |
| w28 | 011100 | 0.4312 − 0.6264i | 0.22 − 1.4139i | 0.2138 − 1.3886i | 0.2104 − 1.3777i |
| w29 | 011101 | 0.1656 − 0.704i | 1.0365 − 0.1654i | 1.0341 − 0.1697i | 1.0327 − 0.1711i |
| w30 | 011110 | 0.1344 − 0.2679i | 1.1427 − 0.5815i | 1.1369 − 0.5756i | 1.1323 − 0.5718i |
| w31 | 011111 | 0.129 − 0.4136i | 1.4139 − 0.22i | 1.3886 − 0.2138i | 1.3777 − 0.2104i |
| w32 | 100000 | −0.9016 + 0.5974i | −0.5815 + 1.1427i | −0.5756 + 1.1369i | −0.5718 + 1.1323i |
| w33 | 100001 | −1.0353 + 0.2i | −0.4117 + 0.1362i | −0.421 + 0.1444i | −0.4239 + 0.1471i |
| w34 | 100010 | −1.2336 + 0.8212i | −0.4313 + 0.7216i | −0.4462 + 0;7457i | −0.452 + 0.7592i |
| w35 | 100011 | −1.4364 + 0.2832i | −0.4156 + 0.4156i | −0.4351 + 0.4351i | −0.4455 + 0.4455i |
| w36 | 100100 | −0.6264 + 0.4312i | −0.1654 + 1.0365i | −0.1697 + 1.0341i | −0.1711 + 1.0327i |
| w37 | 100101 | −0.704 + 0.1656i | −0.1346 + 0.1346i | −0.1404 + 0.1404i | −0.1406 + 0.1406i |
| w38 | 100110 | −0.2679 + 0.1344i | −0.1428 + 0.7103i | −0.1456 + 0.7148i | −0.1483 + 0.7168i |
| w39 | 100111 | −0.4136 + 0.129i | −0.1362 + 0.4117i | −0.1444 + 0.421i | −0.1471 + 0.4239i |
| w40 | 101000 | −0.5974 + 0.9016i | −1.022 + 1.022i | −1.0146 + 1.0146i | −1.0128 + 1.0128i |
| w41 | 101001 | −0.2 + 1.0353i | −0.7103 + 0.1428i | −0.7148 + 0.1456i | −0.7168 + 0.1483i |
| w42 | 101010 | −0.8212 + 1.2336i | −0.743 + 0.743i | −0.7617 + 0.7617i | −0.7688 + 0.7688i |
| w43 | 101011 | −0.2832 + 1.4364i | −0.7216 + 0.4313i | −0.7457 + 0.4462i | −0.7592 + 0.452i |
| w44 | 101100 | −0.4312 + 0.6264i | −0.22 + 1.4139i | −0.2138 + 1.3886i | −0.2104 + 1.3777i |
| w45 | 101101 | −0.1656 + 0.704i | −1.0365 + 0.1654i | −1.0341 + 0.1697i | −1.0327 + 0.1711i |
| w46 | 101110 | −0.1344 + 0.2679i | −1.1427 + 0.5815i | −1.1369 + 0.5756i | −1.1323 + 0.5718i |
| w47 | 101111 | −0.129 + 0.4136i | −1.4139 + 0.22i | −1.3886 + 0.2138i | −1.3777 + 0.2104i |
| w48 | 110000 | −0.9016 − 0.5974i | −0.5815 − 1.1427i | −0.5756 − 1.1369i | −0.5718 − 1.1323i |
| w49 | 110001 | −1.0353 − 0.2i | −0.4117 − 0.1362i | −0.421 − 0.1444i | −0.4239 − 0.1471i |
| w50 | 110010 | −1.2336 − 0.8212i | −0.4313 − 0.7216i | −0.4462 − 0.7457i | −0.452 − 0.7592i |
| w51 | 110011 | −1.4364 − 0.2832i | −0.4156 − 0.4156i | −0.4351 − 0.4351i | −0.4455 − 0.4455i |
| w52 | 110100 | −0.6264 − 0.4312i | −0.1654 − 1.0365i | −0.4697 − 1.0341i | −0.1711 − 1.0327i |
| w53 | 110101 | −0.704 − 0.1656i | −0.1346 − 0.1346i | −0.1404 − 0.1404i | −0.1406 − 0.1406i |
| w54 | 110110 | −0.2679 − 0.1344i | −0.1428 − 0.7103i | −0.1456 − 0.7148i | −0.1483 − 0.7168i |
| w55 | 110111 | −0.4136 − 0.129i | −0.1362 − 0.4117i | −0.1444 − 0.421i | −0.1471 − 0.4239i |
| w56 | 111000 | −0.5974 − 0.9016i | −1.022 − 1.022i | −1.0146 − 1.0146i | −1.0128 − 1.0128i |
| w57 | 111001 | −0.2 − 1.0353i | −0.7103 − 0.1428i | −0.7148 − 0.1456i | −0.7168 − 0.1483i |
| w58 | 111010 | −0.8212 − 1.2336i | −0.743 − 0.743i | −0.7617 − 0.7617i | −0.7688 − 0.7688i |
| w59 | 111011 | −0.2832 − 1.4364i | −0.7216 − 0.4313i | −0.7457 − 0.4462i | 0.7592 − 0.452i |
| w60 | 111100 | −0.4312 − 0.6264i | −0.22 − 1.4139i | −0.2138 − 1.3886i | −0.2104 − 1.3777i |
| w61 | 111101 | −0.1656 − 0.704i | −1.0365 − 0.1654i | −1.0341 − 0.4697i | −1.0327 − 0.1711i |
| w62 | 111110 | −0.1344 − 0.2679i | −1.1427 − 0.5815i | −1.1369 − 0.5756i | −1.1323 − 0.5718i |
| w63 | 111111 | −0.129 − 0.4136i | −1.4139 − 0.22i | −1.3886 − 0.2138i | −1.3777 − 0.2104i | b) Non-Uniform Constellations of Groups A'-D':

| w | bit label | MCS A' | MCS B' | MCS C' | MCS D' |
|---|---|---|---|---|---|
| w0 | 000000 | 1.4517 + 0.2852i | 1.116 + 1.116i | 0.1241 + 0.4079i | 0.1234 + 0.3623i |
| w1 | 000001 | 1.2411 + 0.8251i | 1.0666 + 0.6574i | 0.2738 + 1.3901i | 0.7113 + 1.0543i |
| w2 | 000010 | 1.0371 + 0.1999i | 0.6574 + 1.0666i | 0.3604 + 0.3604i | 0.1732 + 0.6004i |
| w3 | 000011 | 0.8961 + 0.593i | 0.6975 + 0.6975i | 0.8036 + 1.2098i | 0.5312 + 0.7971i |
| w4 | 000100 | 0.3888 + 0.1319i | 1.0439 + 0.1639i | 0.1472 + 0.7443i | 0.3799 + 1.5056i |
| w5 | 000101 | 0.2695 + 0.1322i | 1.4185 + 0.3088i | 0.2059 + 1.0496i | 0.2354 + 1.1872i |
| w6 | 000110 | 0.6914 + 0.1642i | 0.7083 + 0.1333i | 0.4382 + 0.6623i | 0.4473 + 0.4473i |
| w7 | 000111 | 0.62 + 0.4147i | 0.6781 + 0.3902i | 0.6083 + 0.9139i | 0.1816 + 0.8968i |
| w8 | 001000 | 0.2852 + 1.4517i | 0.1639 + 1.0439i | 0.1262 + 0.1262i | 0.1222 + 0.1222i |
| w9 | 001001 | 0.8251 + 1.2411i | 0.1333 + 0.7083i | 1.3901 + 0.2738i | 1.0543 + 0.7113i |
| w10 | 001010 | 0.1999 + 1.0371i | 0.3088 + 1.4185i | 0.4079 + 0.1241i | 0.3623 + 0.1234i |
| w11 | 001011 | 0.593 + 0.8961i | 0.3902 + 0.6781i | 1.2098 + 0.8036i | 0.7971 + 0.5312i |
| w12 | 001100 | 0.1319 + 0.3888i | 0.128 + 0.128i | 0.7443 + 0.1472i | 1.5056 + 0.3799i |
| w13 | 001101 | 0.1322 + 0.2695i | 0.125 + 0.3981i | 1.0496 + 0.2059i | 1.1872 + 0.2354i |
| w14 | 001110 | 0.1642 + 0.6914i | 0.3981 + 0.125i | 0.6623 + 0.4382i | 0.6004 + 0.1732i |
| w15 | 001111 | 0.4147 + 0.62i | 0.39 + 0.39i | 0.9139 + 0.6083i | 0.8968 + 0.1816i |
| w16 | 010000 | 1.4517 − 0.2852i | 1.116 − 1.116i | 0.1241 − 0.4079i | 0.1234 − 0.3623i |
| w17 | 010001 | 1.2411 − 0.8251i | 1.0666 − 0.6574i | 0.2738 − 1.3901i | 0.7113 − 1.0543i |
| w18 | 010010 | 1.0371 − 0.1999i | 0.6574 − 1.0666i | 0.3604 − 0.3604i | 0.1732 − 0.6004i |
| w19 | 010011 | 0.8961 − 0.593i | 0.6975 − 0.6975i | 0.8036 − 1.2098i | 0.5312 − 0.7971i |
| w20 | 010100 | 0.3888 − 0.1319i | 1.0439 − 0.1639i | 0.1472 − 0.7443i | 0.3799 − 1.5056i |
| w21 | 010101 | 0.2695 − 0.1322i | 1.4185 − 0.3088i | 0.2059 − 1.0496i | 0.2354 − 1.1872i |
| w22 | 010110 | 0.6914 − 0.1642i | 0.7083 − 0.1333i | 0.4382 − 0.6623i | 0.4473 − 0.4473i |
| w23 | 010111 | 0.62 − 0.4147i | 0.6781 − 0.3902i | 0.6083 − 0.9139i | 0.1816 − 0.8968i |
| w24 | 011000 | 0.2852 − 1.4517i | 0.1639 − 1.0439i | 0.1262 − 0.1262i | 0.1222 − 0.1222i |
| w25 | 011001 | 0.8251 − 1.2411i | 0.1333 − 0.7083i | 1.3901 − 0.2738i | 1.0543 − 0.7113i |
| w26 | 011010 | 0.1999 − 1.0371i | 0.3088 − 1.4185i | 0.4079 − 0.1241i | 0.3623 − 0.1234i |
| w27 | 011011 | 0.593 − 0.8961i | 0.3902 − 0.6781i | 1.2098 − 0.8036i | 0.7971 − 0.5312i |
| w28 | 011100 | 0.1319 − 0.3888i | 0.128 − 0.128i | 0.7443 − 0.1472i | 1.5056 − 0.3799i |
| w29 | 011101 | 0.1322 − 0.2695i | 0.125 − 0.3981i | 1.0496 − 0.2059i | 1.1872 − 0.2354i |
| w30 | 011110 | 0.1642 − 0.6914i | 0.3981 − 0.125i | 0.6623 − 0.4382i | 0.6004 − 0.1732i |
| w31 | 011111 | 0.4147 − 0.62i | 0.39 − 0.39i | 0.9139 − 0.6083i | 0.8968 − 0.1816i |
| w32 | 100000 | −1.4517 + 0.2852i | −1.116 + 1.116i | −0.1241 + 0.4079i | −0.1234 + 0.3623i |
| w33 | 100001 | −1.2411 + 0.8251i | −1.0666 + 0.6574i | −0.2738 + 1.3901i | −0.7113 + 1.0543i |
| w34 | 100010 | −1.0371 + 0.1999i | −0.6574 + 1.0666i | −0.3604 + 0.3604i | −0.1732 + 0.6004i |
| w35 | 100011 | −0.8961 + 0.593i | −0.6975 + 0.6975i | −0.8036 + 1.2098i | −0.5312 + 0.7971i |
| w36 | 100100 | −0.3888 + 0.1319i | −1.0439 + 0.1639i | −0.1472 + 0.7443i | −0.3799 + 1.5056i |
| w37 | 100101 | −0.2695 + 0.1322i | −1.4185 + 0.3088i | −0.2059 + 1.0496i | −0.2354 + 1.1872i |
| w38 | 100110 | −0.6914 + 0.1642i | −0.7083 + 0.1333i | −0.4382 + 0.6623i | −0.4473 + 0.4473i |
| w39 | 100111 | −0.62 + 0.4147i | −0.6781 + 0.3902i | −0.6083 + 0.9139i | −0.1816 + 0.8968i |
| w40 | 101000 | −0.2852 + 1.4517i | −0.1639 + 1.0439i | −0.1262 + 0.1262i | −0.1222 + 0.1222i |
| w41 | 101001 | −0.8251 + 1.2411i | −0.1333 + 0.7083i | −1.3901 + 0.2738i | −1.0543 + 0.7113i |
| w42 | 101010 | −0.1999 + 1.0371i | −0.3088 + 1.4185i | −0.4079 + 0.1241i | −0.3623 + 0.1234i |
| w43 | 101011 | −0.593 + 0.8961i | −0.3902 + 0.6781i | −1.2098 + 0.8036i | −0.7971 + 0.5312i |
| w44 | 101100 | −0.1319 + 0.3888i | −0.128 + 0.128i | −0.7443 + 0.1472i | −1.5056 + 0.3799i |
| w45 | 101101 | −0.1322 + 0.2695i | −0.125 + 0.3981i | −1.0496 + 0.2059i | −1.1872 + 0.2354i |
| w46 | 101110 | −0.1642 + 0.6914i | −0.3981 + 0.125i | −0.6623 + 0.4382i | −0.6004 + 0.1732i |
| w47 | 101111 | −0.4147 + 0.62i | −0.39 + 0.39i | −0.9139 + 0.6083i | −0.8968 + 0.1816i |
| w48 | 110000 | −1.4517 − 0.2852i | −1.116 − 1.116i | −0.1241 − 0.4079i | −0.1234 − 0.3623i |
| w49 | 110001 | −1.2411 − 0.8251i | −1.0666 − 0.6574i | −0.2738 − 1.3901i | −0.7113 − 1.0543i |
| w50 | 110010 | −1.0371 − 0.1999i | −0.6574 − 1.0666i | −0.3604 − 0.3604i | −0.1732 − 0.6004i |
| w51 | 110011 | −0.8961 − 0.593i | −0.6975 − 0.6975i | −0.8036 − 1.2098i | −0.5312 − 0.7971i |
| w52 | 110100 | −0.3888 − 0.1319i | −1.0439 − 0.1639i | −0.1472 − 0.7443i | −0.3799 − 1.5056i |
| w53 | 110101 | −0.2695 − 0.1322i | −1.4185 − 0.3088i | −0.2059 − 1.0496i | −0.2354 − 1.1872i |
| w54 | 110110 | −0.6914 − 0.1642i | −0.7083 − 0.1333i | −0.4382 − 0.6623i | −0.4473 − 0.4473i |
| w55 | 110111 | −0.62 − 0.4147i | −0.6781 − 0.3902i | −0.6083 − 0.9139i | −0.1816 − 0.8968i |
| w56 | 111000 | −0.2852 − 1.4517i | −0.1639 − 1.0439i | −0.1262 − 0.1262i | −0.1222 − 0.1222i |
| w57 | 111001 | −0.8251 − 1.2411i | −0.1333 − 0.7083i | −1.3901 − 0.2738i | −1.0543 − 0.7113i |
| w58 | 111010 | −0.1999 − 1.0371i | −0.3088 − 1.4185i | −0.4079 − 0.1241i | −0.3623 − 0.1234i |
| w59 | 111011 | −0.593 − 0.8961i | −0.3902 − 0.6781i | −1.2098 − 0.8036i | −0.7971 − 0.5312i |
| w60 | 111100 | −0.1319 − 0.3888i | −0.128 − 0.128i | −0.7443 − 0.1472i | −1.5056 − 0.3799i |
| w61 | 111101 | −0.1322 − 0.2695i | −0.125 − 0.3981i | −1.0496 − 0.2059i | −1.1872 − 0.2354i |
| w62 | 111110 | −0.1642 − 0.6914i | −0.3981 − 0.125i | −0.6623 − 0.4382i | −0.6004 − 0.1732i |
| w63 | 111111 | −0.4147 − 0.62i | −0.39 − 0.39i | −0.9139 − 0.6083i | −0.8968 − 0.1816i |

Figure 6:
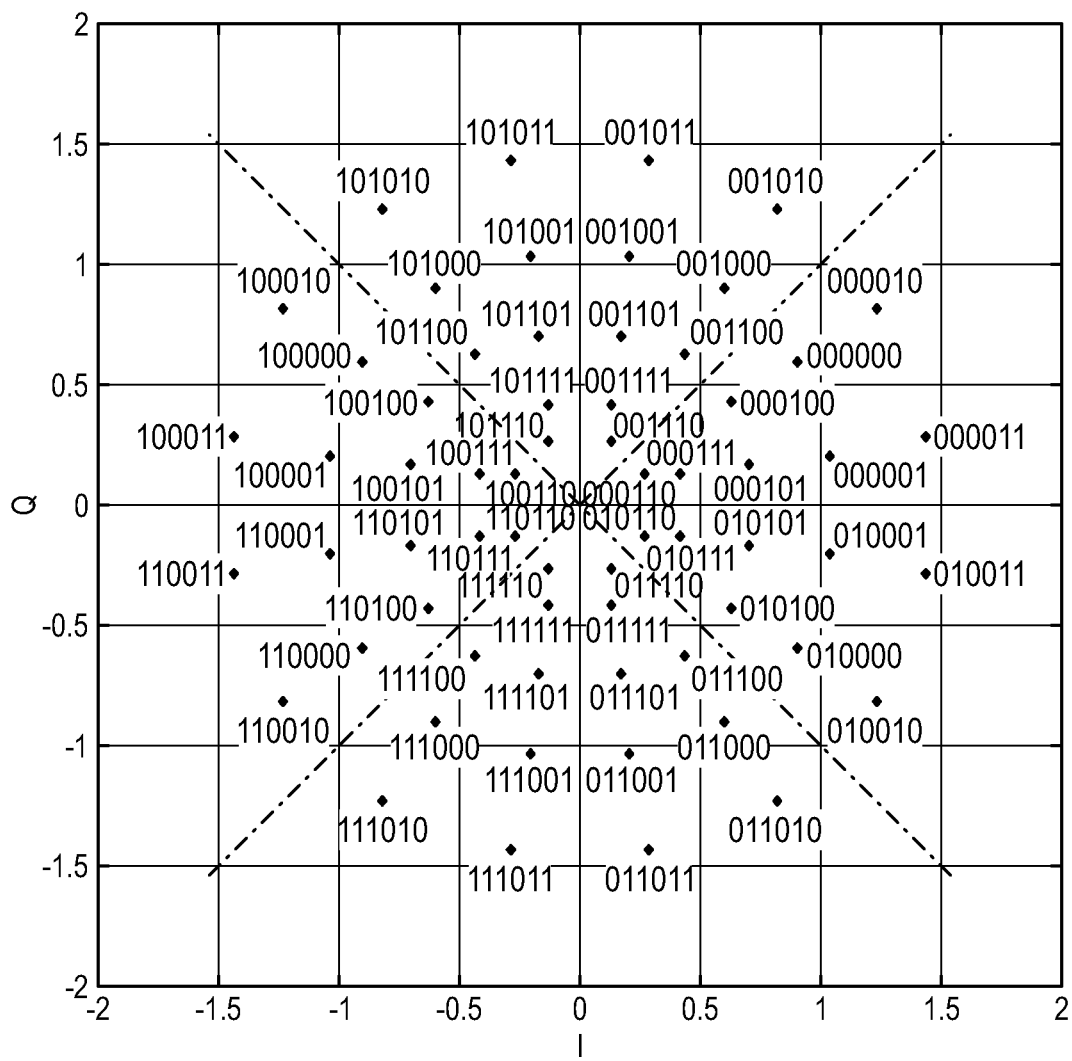
FIGS. 6 to 13 show diagrams of different exemplary two-dimensional non-uniform constellations according to the present disclosure.
Figure 7:
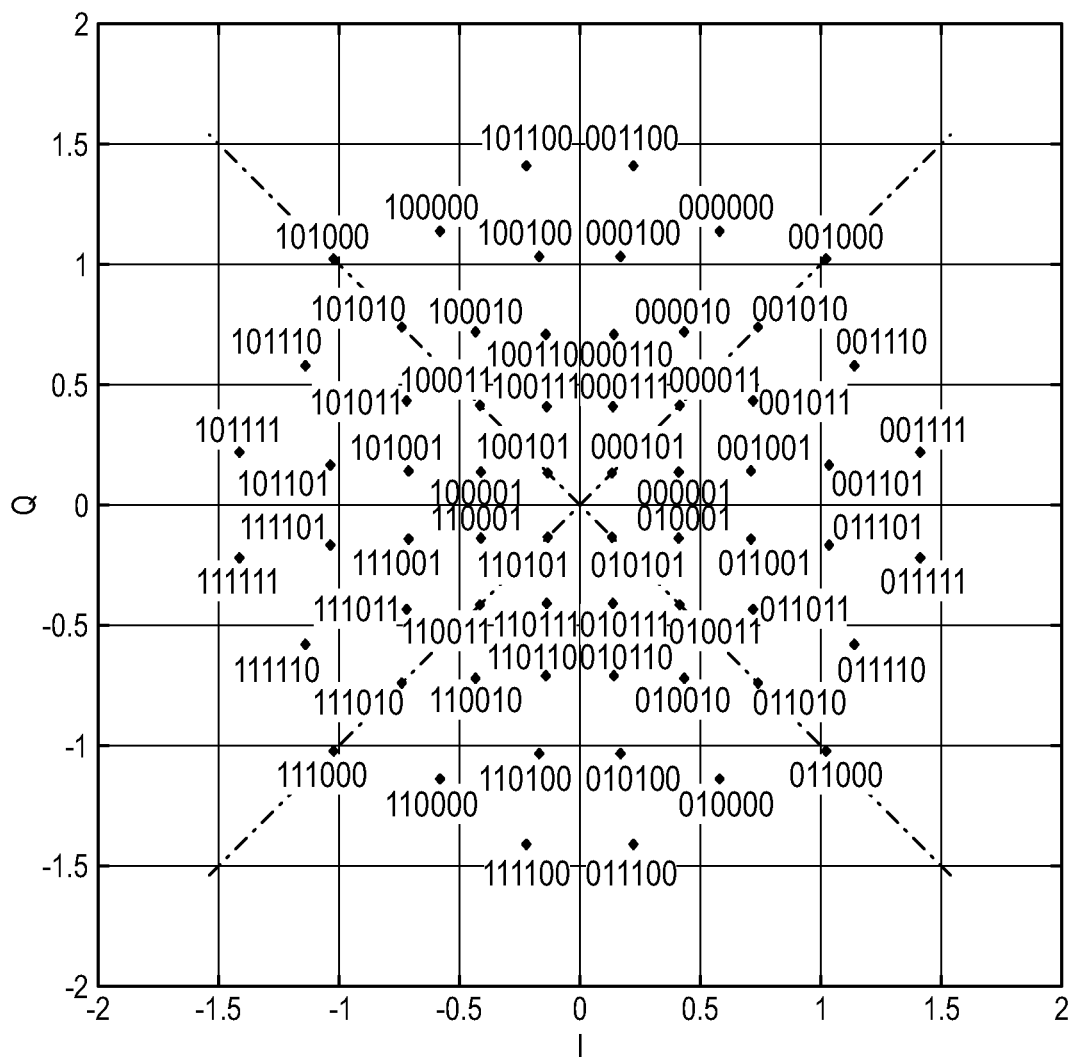
Figure 8:
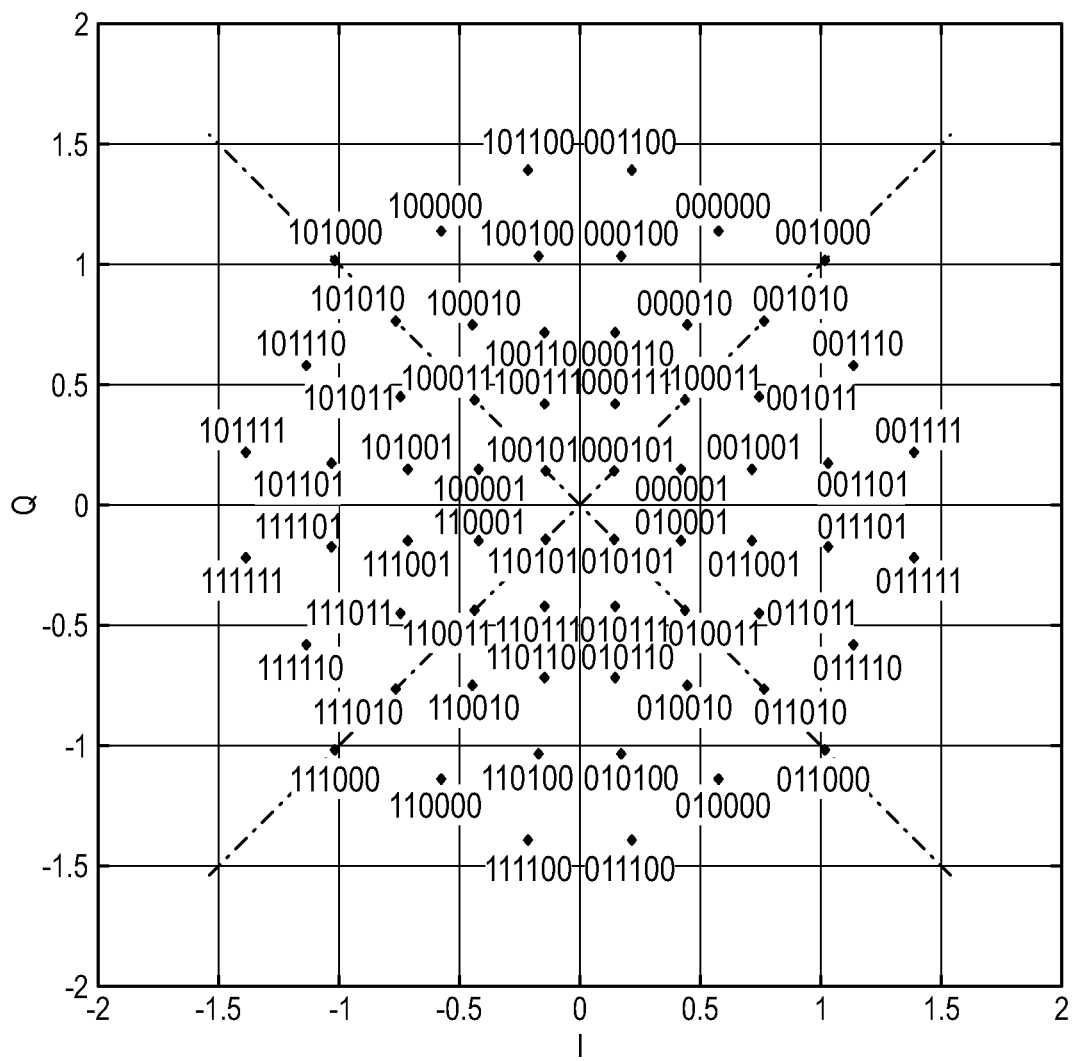
Figure 9:
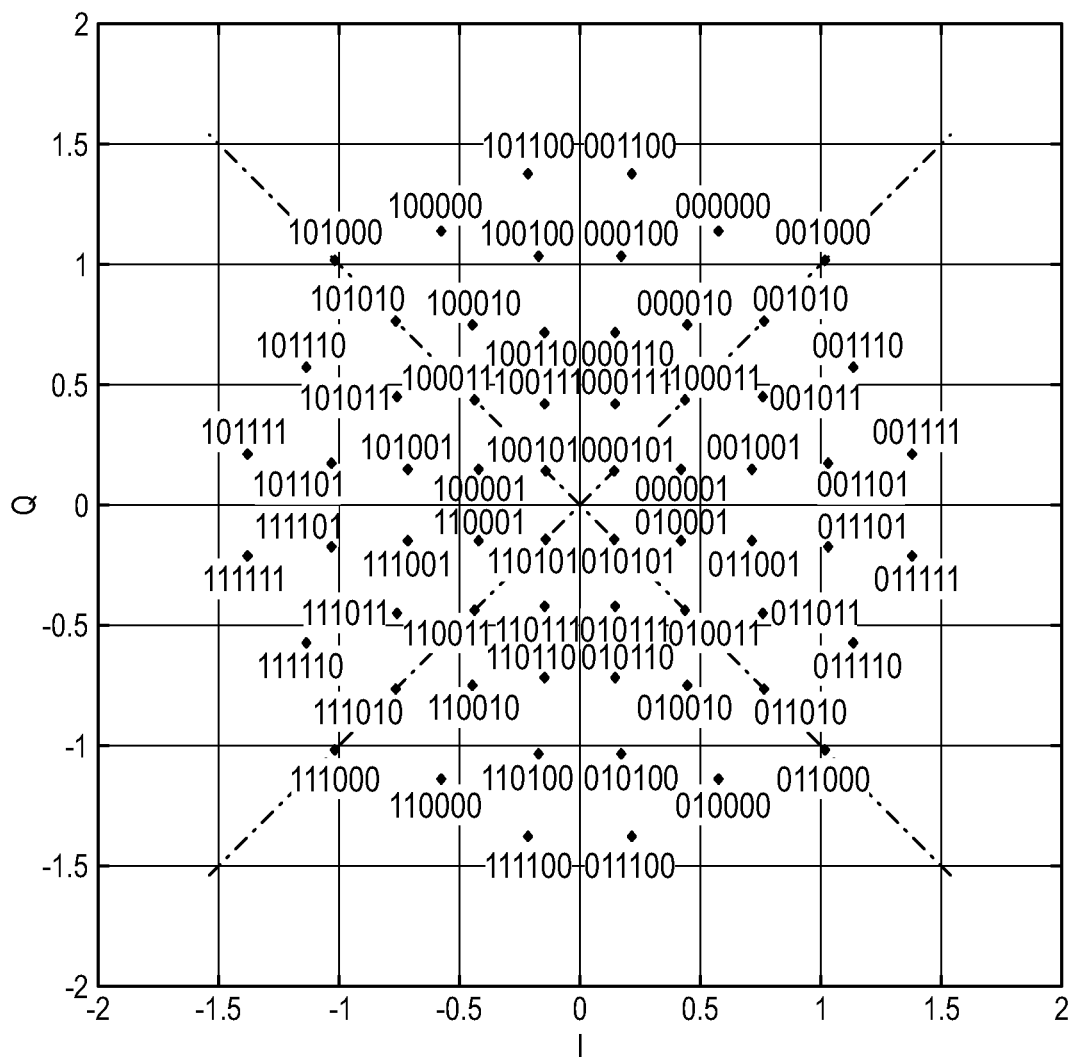
Figure 10:
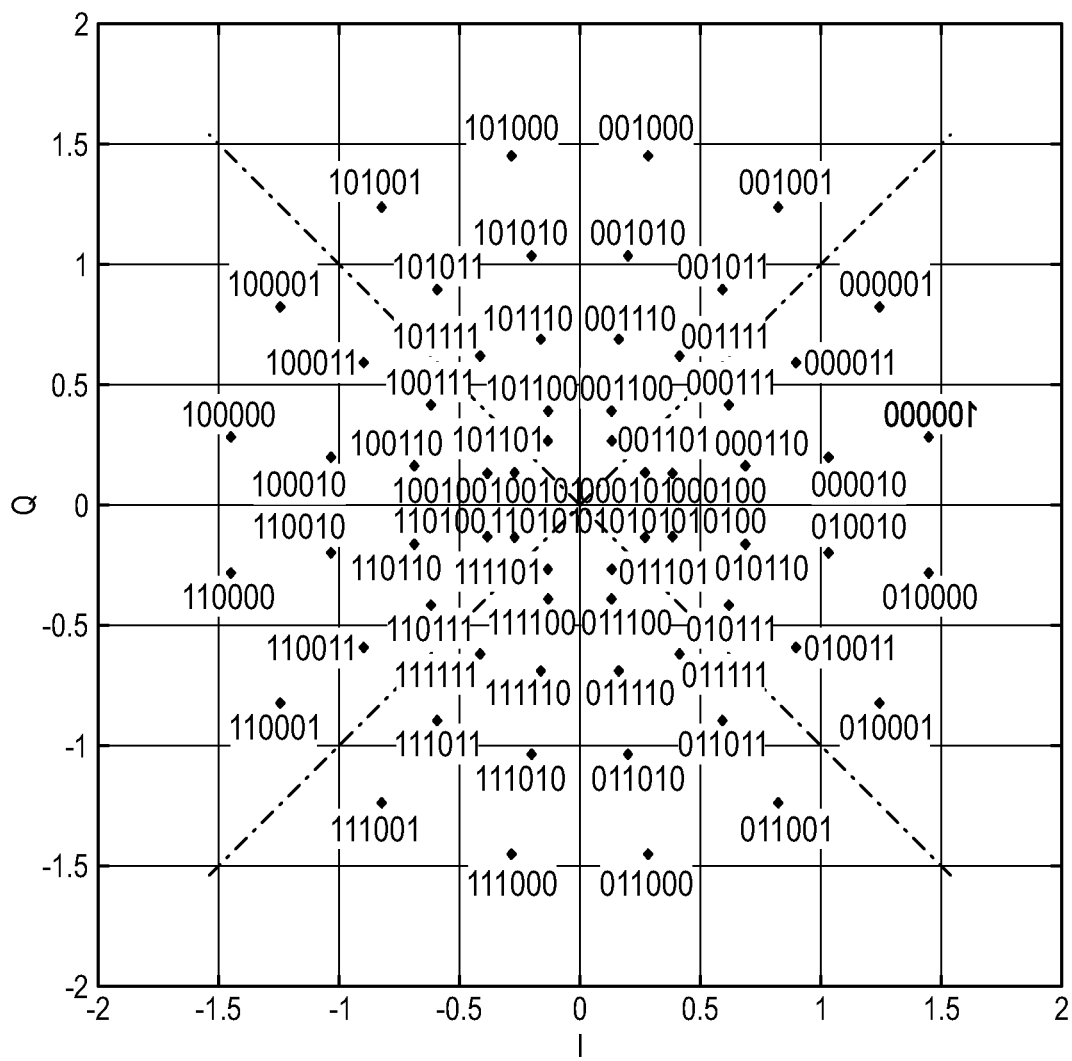
Figure 11:
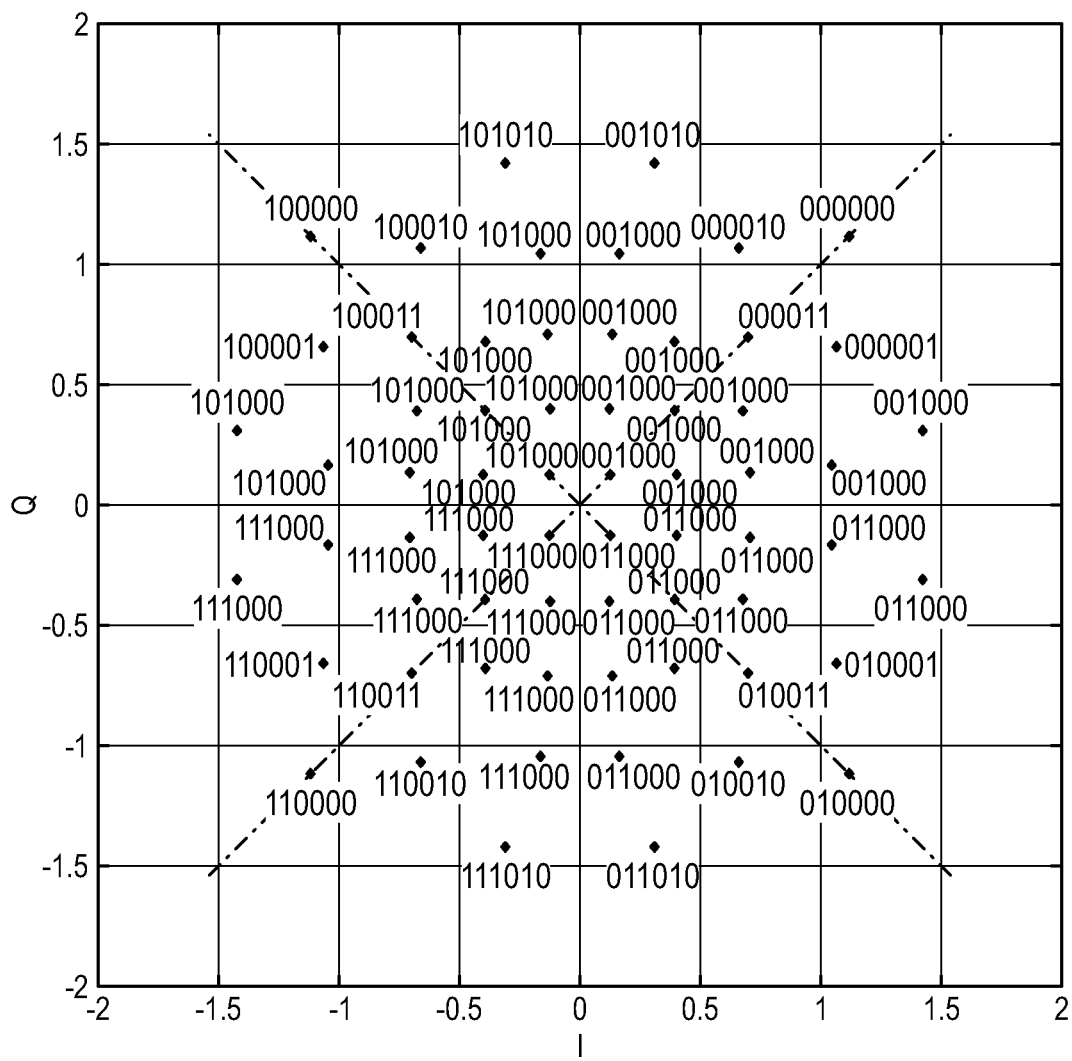
Figure 12:
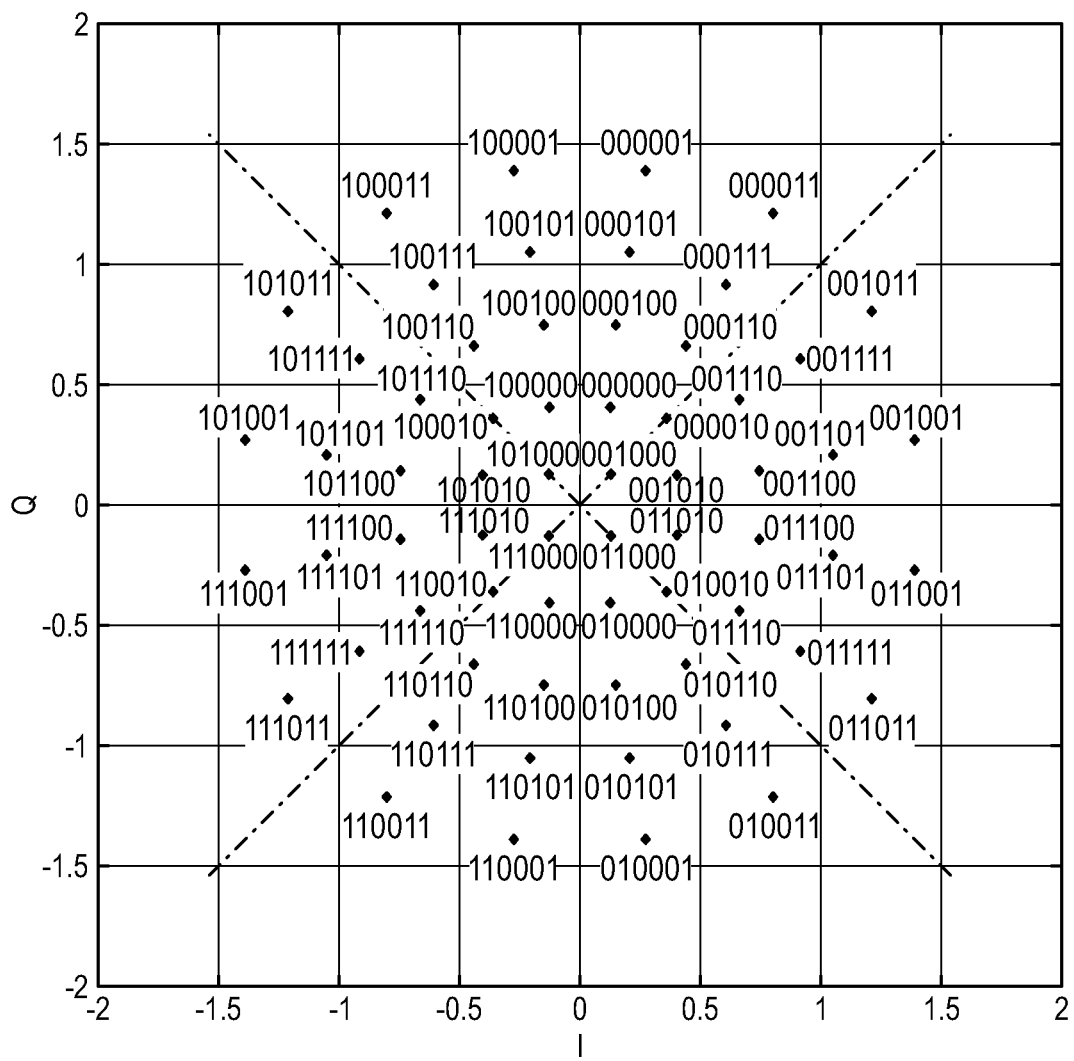
Figure 13:
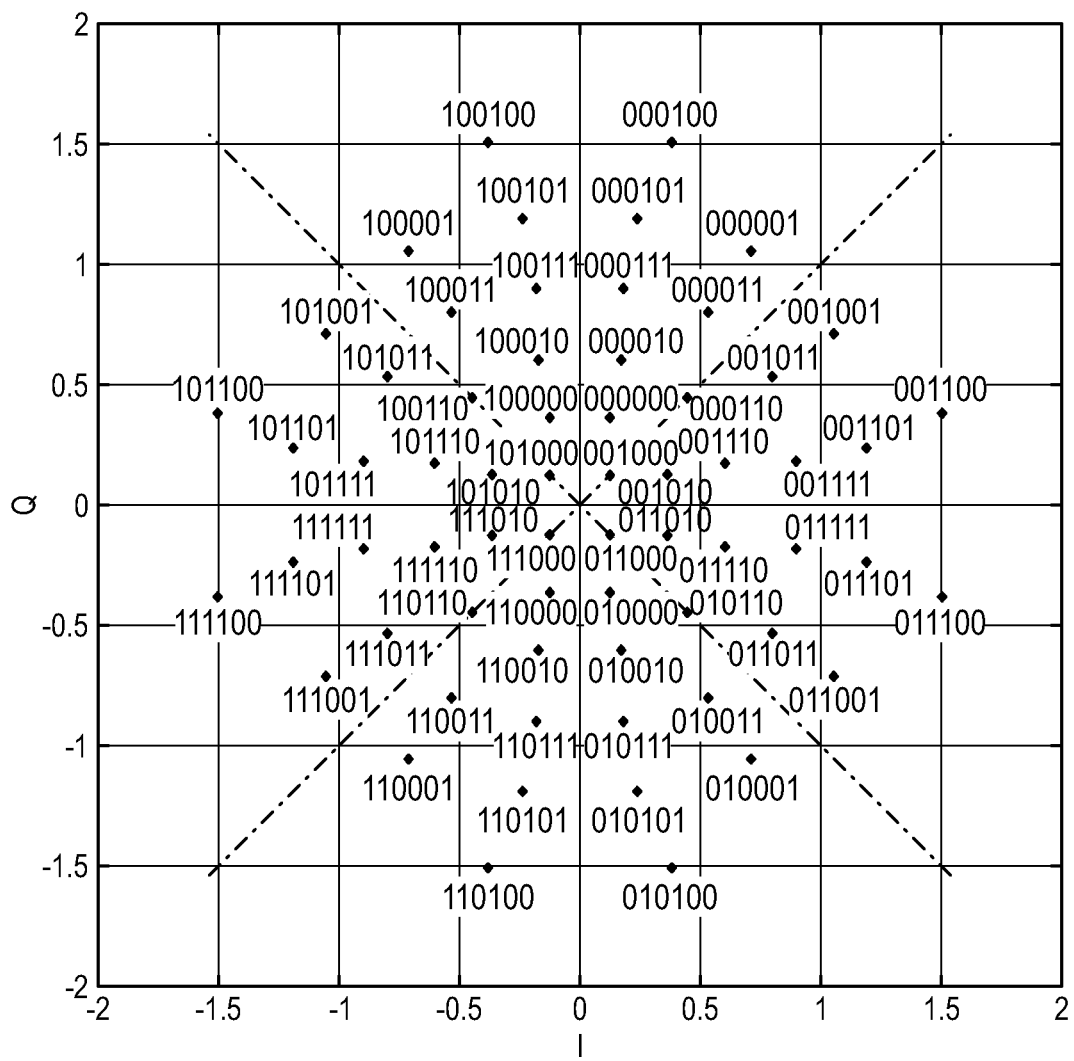

FIG. 6 shows an exemplary constellation for MCS A. FIG. 7 shows an exemplary constellation for MCS B. FIG. 8 shows an exemplary constellation for MCS C. FIG. 9 shows an exemplary constellation for MCS D. FIG. 10 shows an exemplary constellation for MCS A'. FIG. 11 shows an exemplary constellation for MCS B'. FIG. 12 shows an exemplary constellation for MCS C'. FIG. 13 shows an exemplary constellation for MCS D'.

According to an embodiment of the present disclosure, the signal points of an entire constellation can generally be obtained by mirroring a quadrant at the I and Q axes.

Preferably, a constellation according to the present disclosure contains signal points fulfilling the following criteria:
- there are at more than 16 signal points, in particular 32, 64, 128, 256 or 512 signal points;
- the entire signal constellation can be obtained by repeated mirroring signal points of a quadrant at the I and Q axes;
- the Euclidean distance between a signal point and its closest neighbor within a quadrant is not always the same;
- the number of signal points with constant real or imaginary part is not equal to the square root of the total number of signal points, i.e. the constellations are non-uniform;
- at least one signal point within the signal points having the same magnitude has an unequal angular distance to the neighbors in direct vicinity in angular domain (left and right neighbor), i.e. the constellations are not APSK or PSK constellations; and
- signal points within a quadrant fulfill pi/4 symmetry as described above.

One or more of the following criteria may additionally be fulfilled:
- within a quadrant, there exists either one signal point on the pi/4 axis which has a magnitude different from all other signal points or two signal points with the same magnitude different from all other signal points;
- the distribution of number of signal points (within a quadrant) sorted by magnitude in increasing order as
  (2, 2, 2, 2, 2, 2, 2, 2) or
  (1, 2, 1, 2, 2, 2, 1, 2, 2, 1) or
  (1, 2, 1, 2, 2, 1, 2, 2, 2, 1) or
  (1, 2, 1, 2, 2, 2, 2, 2) or
  (1, 2, 2, 1, 2, 2, 2, 2, 2);
- within a quadrant, at least one bit label in a lower or upper octant differs in more than one bit from the bit label of the corresponding pi/4 symmetrical signal point in the upper or lower octant.

In this context "magnitude" is defined as follows $$|x|=\sqrt{\operatorname{Re}\{x\}^2+\operatorname{Im}\{x\}^2}$$

which can be interpreted to be the distance from the origin of the constellation or IQ diagram to signal point x. The phase of a signal point x is defined by $$\varphi = \arg(x) = \tan^{-1}\left[\frac{\operatorname{Im}\{x\}}{\operatorname{Re}\{x\}}\right] + \begin{cases} 0 & \text{if } \operatorname{Re}\{x\} \geq 0 \\ \pi & \text{if } \operatorname{Re}\{x\} < 0 \text{ and } \operatorname{Im}\{x\} \geq 0 \\ -\pi & \text{if } \operatorname{Re}\{x\} < 0 \text{ and } \operatorname{Im}\{x\} < 0 \end{cases}$$

where it is assumed that $\tan^{-1}[x]$ saturates at $\pi/2$ for $x \to \infty$ and $-\pi/2$ for $x \to -\infty$, respectively. Any complex signal point x has a Cartesian (IQ) and a polar representation which is equivalent:

$$x=\operatorname{Re}\{x\}+i\cdot\operatorname{Im}\{x\}$$

$$x=|x|\cdot e^{i\arg(x)}=|x|\cdot\{\cos[\arg(x)]+i\cdot\sin[\arg(x)]\}$$

In summary, this disclosure proposes the design of NUCs in AWGN and AWGN+PN channels which can be beneficial in SC communication systems. In particular, the proposed NUCs feature symmetry at ±pi/4 axes (octant symmetry) which can be beneficial for demapping in SC systems featuring a continuous pi/2 phase shift. As an implementation example, NUCs for 802.11ay are proposed. Those NUCs achieve significant SNR gain and are more robust against phase noise compared to conventional UCs.

Obviously, numerous modifications and variations of the present disclosure are possible in light of the above teachings. It is therefore to be understood that within the scope of the appended claims, the disclosure may be practiced otherwise than as specifically described herein (e.g., if the NUC position vectors are rounded to a smaller number of digits).

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A coding and modulation apparatus comprising
   an encoder configured to encode input data into cell words according to a low density parity check code, LDPC, and
   a modulator configured to modulate said cell words into constellation values of a non-uniform constellation and to assign bit combinations to constellation values of the used non-uniform constellation, wherein said modulator is configured to use
   i) a non-uniform constellation and bit labeling from one of the following groups A-D and A'-D' of constellations or
   ii) a non-uniform constellation obtained from a constellation of the following groups AD and A'-D' of constellations through rotation by an angle around the origin, through inversion of bit labels for all constellation points, through interchanging of bit positions, through mirroring on any line in the complex plane and/or through predistortion for the constellation points, wherein the constellation points are defined by a constellation position vector $w_0 \ldots w_{N-1}$, and wherein the constellation position vectors of the different constellations are defined as follows:

a) non-uniform constellations of groups A-D as disclosed herein, b) non-uniform constellations of groups A'-D' as disclosed herein, wherein the bit labeling indicated in groups A-D and A'-D' may alternatively be inverted for one or more bit labels.

2. The coding and modulation apparatus as defined in embodiment 1, further comprising a selection unit configured to select the code rate R based on channel conditions of a communications channel between a transmission apparatus including said coding and modulation apparatus and a receiving apparatus with which said transmission apparatus seeks to communicate.

3. The coding and modulation apparatus as defined in embodiment 2, wherein said selection unit is configured to select a constellation with a higher code rate the better the channel conditions are.

4. The coding and modulation apparatus as defined in embodiment 2, wherein said selection unit is configured to select a constellation based on the desired signal-to-noise ratio.

5. The coding and modulation apparatus as defined in embodiment 1, further comprising a reception unit configured to receive receiver signalling information including one or more of a) the code rate R of a constellation to be used, b) an indication of the constellation to be used, c) constellation points of a constellation to be used, d) channel conditions of a communications channel between a transmission apparatus including said coding and modulation apparatus and a receiving apparatus with which said transmission apparatus seeks to communicate, and e) PHY impairments at the receiving apparatus.

6. The coding and modulation apparatus as defined in embodiment 1, wherein said coding and modulation apparatus is configured for use in a transmission apparatus according to IEEE 802.11.

7. The coding and modulation apparatus as defined in embodiment 1, wherein said modulator is configured to use one or more of said constellations and bit labellings for one or more of code rates R=5/8, R=3/4, R=13/16 and R=7/8.

8. The coding and modulation apparatus as defined in embodiment 1, wherein said modulator is configured to use a constellation and bit labelling of groups A and A' for code rate R=5/8, or to use a constellation and bit labelling of groups B and B' for code rate R=3/4, or to use a constellation and bit labelling of groups C and C' for code rate R=13/16, or to use a constellation and bit labelling of groups D and D' for code rate R=7/8.

9. A coding and modulation method comprising
encoding input data into cell words according to a low density parity check code, LDPC, and
modulating said cell words into constellation values of a non-uniform constellation and to assign bit combinations to constellation values of the used non-uniform constellation, wherein said modulating is configured to use
i) a non-uniform constellation and bit labeling from one of the following groups A-D and A'-D' of constellations or
ii) a non-uniform constellation obtained from a constellation of the following groups AD and A'-D' of constellations through rotation by an angle around the origin, through inversion of bit labels for all constellation points, through interchanging of bit positions, through mirroring on any line in the complex plane and/or through predistortion for the constellation points, wherein the constellation points are defined by a constellation position vector $w0 \ldots wN-1$, and wherein the constellation position vectors of the different constellations are defined as follows:

a) non-uniform constellations of groups A-D as disclosed herein, b) non-uniform constellations of groups A'-D' as disclosed herein, wherein the bit labeling indicated in groups A-D and A'-D' may alternatively be inverted for one or more bit labels.

10. A transmission apparatus comprising:
a coding and modulation apparatus as defined in embodiment 1 configured to encode and modulate input data into constellation values,
a converter configured to convert said constellation values into one or more transmission streams to be transmitted, and
a transmitter configured to transmit said one or more transmission streams.

11. The transmission apparatus as defined in embodiment 10,
further comprising a transmitter signalling unit configured to embed transmitter signalling information into the one or more transmission streams, said transmitter signalling information including one or more of a) the code rate R of a constellation used, b) an indication of the constellation used, and c) constellation points of a constellation used.

12. The transmission apparatus as defined in embodiment 11,
wherein said modulation unit is configured to select using a uniform constellation instead of one of said non-uniform constellations for modulating said cell words into constellation values, and
wherein said transmitter signalling unit is configured to embed transmitter signalling information into the one or more transmission streams, said transmitter signalling information including constellation information indicating if a non-uniform constellation or a uniform constellation has been used for modulation.

13. The transmission apparatus as defined in embodiment 11,
wherein said transmitter signalling unit is configured to embed said transmitter signalling information in the header at the beginning of frames of a plurality of frames used for transmission of the one or more transmission streams.

14. A transmission method comprising:
a coding and modulation method as defined in embodiment 9 that encodes and modulates input data into constellation values,
converting said constellation values into one or more transmission streams to be transmitted, and
transmitting said one or more transmission streams.

15. A demodulation and decoding apparatus comprising:
a demodulator configured to demodulate constellation values of a non-uniform constellation into cell words and to assign bit combinations to constellation values of the used non-uniform constellation, and
a decoder configured to decode cell words into output data according to a low density parity check code, LDPC, wherein said demodulator is configured to use i) a non-uniform constellation and bit labeling from one of the following groups A-D and A'-D' of constellations or ii) a non-uniform constellation obtained from a constellation of the following groups AD and A'-D' of constellations through rotation by an angle around the origin, through inversion of bit labels for all constellation points, through interchanging of bit positions, through mirroring on any line in the complex plane and/or through predistortion for the constellation points, wherein the constellation points are defined by a constellation position vector w0 . . . wN–1, and wherein the constellation position vectors of the different constellations are defined as follows:

a) non-uniform constellations of groups A-D as disclosed herein, b) non-uniform constellations of groups A'-D' as disclosed herein, wherein the bit labeling indicated in groups A-D and A'-D' may alternatively be inverted for one or more bit labels.

16. A demodulation and decoding method comprising:

demodulating constellation values of a non-uniform constellation into cell words and assigning bit combinations to constellation values of the used non-uniform constellation, and decoding cell words into output data according to a low density parity check code, LDPC, wherein said demodulating is configured to use i) a non-uniform constellation and bit labeling from one of the following groups A-D and A'-D' of constellations or ii) a non-uniform constellation obtained from a constellation of the following groups AD and A'-D' of constellations through rotation by an angle around the origin, through inversion of bit labels for all constellation points, through interchanging of bit positions, through mirroring on any line in the complex plane and/or through predistortion for the constellation points, wherein the constellation points are defined by a constellation position vector $w_0$ . . . $w_{N-1}$, and wherein the constellation position vectors of the different constellations are defined as follows:

a) non-uniform constellations of groups A-D as disclosed herein, b) non-uniform constellations of groups A'-D' as disclosed herein, wherein the bit labeling indicated in groups A-D and A'-D' may alternatively be inverted for one or more bit labels.

17. A receiving apparatus comprising:

a receiver configured to receive one or more transmission streams, a deconverter configured to deconvert one or more transmission streams into said constellation values, and a demodulation and decoding apparatus as defined in embodiment 15 configured to demodulate and decode said constellation values into output data.

18. The receiving apparatus as defined in embodiment 17, further comprising a receiver signalling unit configured to transmit receiver signalling information to a transmission apparatus with which said receiving apparatus seeks to communicate, said receiver signalling information including one or more of a) the code rate R of a constellation to be used, b) an indication of the constellation to be used, c) constellation points of a constellation to be used, d) channel conditions of a communications channel between the receiving apparatus and a transmission apparatus with which said receiving apparatus seeks to communicate and e) PHY impairments at the receiving apparatus.

19. The receiving apparatus as defined in embodiment 17, further comprising an evaluation unit configured to analyze channel conditions of a communications channel between the receiving apparatus and a transmission apparatus with which said receiving apparatus seeks to communicate and/or PHY impairments at the receiving apparatus and to determine said signalling information based on the analyzed channel conditions and/or PHY impairments.

20. A receiving method comprising:

receiving one or more transmission streams, deconverting one or more transmission streams into said constellation values, and a demodulation and decoding method as defined in embodiment 15 for demodulating and decoding said constellation values into output data.

21. A non-transitory computer-readable recording medium that stores therein a computer program product, which, when executed by a processor, causes the method according to embodiment 9 or 16 to be performed.

22. A communications system comprising one or more transmission apparatus as defined in embodiment 1 and one or more receiving apparatus as defined in embodiment 17.

23. A coding and modulation apparatus comprising an encoder configured to encode input data into cell words according to a low density parity check code, LDPC, and a modulator configured to modulate said cell words into constellation values of a non-uniform constellation and to assign bit combinations to constellation values of the used non-uniform constellation, wherein said modulator is configured to use i) a non-uniform constellation, wherein the constellation comprises 32, 64, 128 or 256 constellation points, the constellation points in each quadrant of the constellation diagram either have a mirror constellation point in the same quadrant mirrored at the π/4 or –π/4 axis or lie on the π/4 or –π/4 axis, the constellation points in each quadrant of the constellation diagram are symmetrical to the constellation points in all other quadrant, at least one signal point within the signal points having same magnitude has an unequal angular distance to the neighbors in direct vicinity in angular domain, and the Euclidean distance between two nearest neighboring constellation points in a quadrant is different for different pairs of nearest neighboring constellation points, or ii) a non-uniform constellation obtained from a constellation according to i) through rotation by an angle around the origin, through inversion of bit labels for all constellation points, through interchanging of bit positions, through mirroring on any line in the complex plane and/or through predistortion for the constellation points.

24. The coding and modulation apparatus as defined in embodiment 23, wherein said modulator is configured to use a non-uniform constellation, wherein in a quadrant there exists at least one constellation point laying on the π/4 or –π/4 axis and/or at least two constellation points with the same magnitude that is different from the magnitude of other constellation points in the same quadrant.

25. The coding and modulation apparatus as defined in embodiment 23, wherein said modulator is configured to use a non-uniform constellation having 64 constellation points, wherein the distribution of the number of constellation points in a quadrant, sorted by magnitude in increasing order, is (2, 2, 2, 2, 2, 2, 2, 2) or
(1, 2, 1, 2, 2, 2, 1, 2, 2, 1) or
(1, 2, 1, 2, 2, 1, 2, 2, 2, 1) or
(1, 2, 1, 2, 2, 2, 2, 2, 2) or
(1, 2, 2, 1, 2, 2, 2, 2, 2).

26. The coding and modulation apparatus as defined in embodiment 23, wherein said modulator is configured to use a non-uniform constellation, wherein in a quadrant at least one bit label of a constellation point differs in more than one bit from the bit label of the mirror constellation point mirrored at the π/4 or −π/4 axis in the same quadrant.

27. A computer program comprising program code means for causing a computer to perform the steps of said method according to embodiment 9 or 16 when said computer program is carried out on a computer.

28. A coding and modulation method corresponding to the coding and modulation device as defined in embodiments 23-26.

29. A demodulation and decoding device corresponding to the coding and modulation device as defined in embodiments 23-26.

30. A demodulation and decoding method corresponding to the coding and modulation device as defined in embodiments 23-26.

The invention claimed is:

1. A coding and modulation apparatus, comprising:
an encoding circuit configured to encode input data into cell words according to a low density parity check (LDPC) code, and
a modulating circuit configured to modulate said cell words into constellation values of a non-uniform constellation and to assign bit combinations to constellation values of the non-uniform constellation, wherein said modulating circuit is configured to use
i) a first non-uniform constellation comprising 64 constellation points, wherein
the constellation points in each quadrant of the constellation diagram either have a mirror constellation point in the same quadrant mirrored at the π/4 or −π/4 axis or lie on the π/4 or −π/4 axis,
the constellation points in each quadrant of the constellation diagram are symmetrical to the constellation points in all other quadrant,
at least one signal point within the signal points having same magnitude has an unequal angular distance to the neighbors in direct vicinity in angular domain,
the Euclidean distance between two nearest neighboring constellation points in a quadrant is different for different pairs of nearest neighboring constellation points, and
the distribution of the number of constellation points in a quadrant, sorted by magnitude in increasing order, is (2, 2, 2, 2, 2, 2, 2, 2) or (1, 2, 1, 2, 2, 2, 1, 2, 2, 1) or (1, 2, 1, 2, 2, 1, 2, 2, 2, 1) or (1, 2, 1, 2, 2, 2, 2, 2, 2, 2) or (1, 2, 2, 1, 2, 2, 2, 2, 2), or
ii) a second non-uniform constellation comprising 64 constellation points, wherein
the second non-uniform constellation is obtained through rotation by an angle around an origin, through inversion of bit labels for all constellation points, through interchanging of bit positions, through mirroring on any line in the complex plane or through predistortion for the constellation points,
the constellation points in each quadrant of the constellation diagram either have a mirror constellation point in the same quadrant mirrored at the π/4 or −π/4 axis or lie on the π/4 or −π/4 axis,
the constellation points in each quadrant of the constellation diagram are symmetrical to the constellation points in all other quadrant,
at least one signal point within the signal points having same magnitude has an unequal angular distance to the neighbors in direct vicinity in angular domain,
the Euclidean distance between two nearest neighboring constellation points in a quadrant is different for different pairs of nearest neighboring constellation points, and
the distribution of the number of constellation points in a quadrant, sorted by magnitude in increasing order, is (2, 2, 2, 2, 2, 2, 2, 2) or (1, 2, 1, 2, 2, 2, 1, 2, 2, 1) or (1, 2, 1, 2, 2, 1, 2, 2, 2, 1) or (1, 2, 1, 2, 2, 2, 2, 2, 2, 2) or (1, 2, 2, 1, 2, 2, 2, 2, 2).

2. The coding and modulation apparatus as recited in claim 1, wherein said modulating circuit is in a quadrant there exists at least one constellation point laying on the π/4 or −π/4 axis or at least two constellation points with the same magnitude that is different from the magnitude of other constellation points in the same quadrant.

3. The coding and modulation apparatus as recited in claim 1, wherein in a quadrant at least one bit label of a constellation point differs in more than one bit from the bit label of the mirror constellation point mirrored at the π/4 or −π/4 axis in the same quadrant.

4. A transmission apparatus, comprising:
the coding and modulation apparatus as recited in claim 1, configured to encode and modulate input data into constellation values,
a converter configured to convert said constellation values into one or more trans-mission streams to be transmitted, and
a transmitter configured to transmit said one or more transmission streams.

5. A demodulation and decoding apparatus, comprising:
a demodulating circuit configured to demodulate constellation values of a non-uniform constellation into cell words and to assign bit combinations to constellation values of the non-uniform constellation, and
a decoding circuit configured to decode cell words into output data according to a low density parity check (LDPC) code, wherein
said demodulating circuit is configured to use
i) a first non-uniform constellation comprising 64 constellation points, wherein
the constellation points in each quadrant of the constellation diagram either have a mirror constellation point in the same quadrant mirrored at the π/4 or −π/4 axis or lie on the π/4 or −π/4 axis,
the constellation points in each quadrant of the constellation diagram are symmetrical to the constellation points in all other quadrant,
at least one signal point within the signal points having same magnitude has an unequal angular distance to the neighbors in direct vicinity in angular domain,
the Euclidean distance between two nearest neighboring constellation points in a quadrant is different for different pairs of nearest neighboring constellation points, and
the distribution of the number of constellation points in a quadrant, sorted by magnitude in increasing order, is (2, 2, 2, 2, 2, 2, 2, 2) or (1, 2, 1, 2, 2, 2, 1, 2, 2, 1)

or (1, 2, 1, 2, 2, 1, 2, 2, 2, 1) or (1, 2, 1, 2, 2, 2, 2, 2, 2) or (1, 2, 2, 1, 2, 2, 2, 2, 2), or
ii) a second non-uniform constellation comprising 64 constellation points, wherein
the second non-uniform constellation is obtained through rotation by an angle around an origin, through inversion of bit labels for all constellation points, through interchanging of bit positions, through mirroring on any line in the complex plane or through predistortion for the constellation points,
the constellation points in each quadrant of the constellation diagram either have a mirror constellation point in the same quadrant mirrored at the $\pi/4$ or $-\pi/4$ axis or lie on the $\pi/4$ or $-\pi/4$ axis,
the constellation points in each quadrant of the constellation diagram are symmetrical to the constellation points in all other quadrant,
at least one signal point within the signal points having same magnitude has an unequal angular distance to the neighbors in direct vicinity in angular domain,
the Euclidean distance between two nearest neighboring constellation points in a quadrant is different for different pairs of nearest neighboring constellation points, and
the distribution of the number of constellation points in a quadrant, sorted by magnitude in increasing order, is (2, 2, 2, 2, 2, 2, 2, 2) or (1, 2, 1, 2, 2, 2, 1, 2, 2, 1) or (1, 2, 1, 2, 2, 1, 2, 2, 2, 1) or (1, 2, 1, 2, 2, 2, 2, 2) or (1, 2, 2, 1, 2, 2, 2, 2, 2).

6. The decoding and demodulation apparatus as recited in claim 5, wherein in a quadrant there exists at least one constellation point laying on the $\pi/4$ or $-\pi/4$ axis or at least two constellation points with the same magnitude that is different from the magnitude of other constellation points in the same quadrant.

7. The decoding and demodulation apparatus as recited in claim 5, wherein in a quadrant at least one bit label of a constellation point differs in more than one bit from the bit label of the mirror constellation point mirrored at the $\pi/4$ or $-\pi/4$ axis in the same quadrant.

8. A receiving apparatus, comprising:
a receiver configured to receive one or more transmission streams,
a deconverter configured to deconvert one or more transmission streams into said constellation values, and
the demodulation and decoding apparatus as recited in claim 5 configured to demodulate and decode said constellation values into output data.

9. A coding and modulation method, comprising:
encoding input data into cell words according to a low density parity check (LDPC) code, and
modulating said cell words into constellation values of a non-uniform constellation and to assign bit combinations to constellation values of the non-uniform constellation, wherein
said modulating is configured to use
i) a first non-uniform constellation comprising 64 constellation points, wherein
the constellation points in each quadrant of the constellation diagram either have a mirror constellation point in the same quadrant mirrored at the $\pi/4$ or $-\pi/4$ axis or lie on the $\pi/4$ or $-\pi/4$ axis,
the constellation points in each quadrant of the constellation diagram are symmetrical to the constellation points in all other quadrant,
at least one signal point within the signal points having same magnitude has an unequal angular distance to the neighbors in direct vicinity in angular domain,
the Euclidean distance between two nearest neighboring constellation points in a quadrant is different for different pairs of nearest neighboring constellation points, and
the distribution of the number of constellation points in a quadrant, sorted by magnitude in increasing order, is (2, 2, 2, 2, 2, 2, 2, 2) or (1, 2, 1, 2, 2, 2, 1, 2, 2, 1) or (1, 2, 1, 2, 2, 1, 2, 2, 2, 1) or (1, 2, 1, 2, 2, 2, 2, 2) or (1, 2, 2, 1, 2, 2, 2, 2, 2), or
ii) a second non-uniform constellation comprising 64 constellation points, wherein
the second non-uniform constellation is obtained through rotation by an angle around an origin, through inversion of bit labels for all constellation points, through interchanging of bit positions, through mirroring on any line in the complex plane or through predistortion for the constellation points,
the constellation points in each quadrant of the constellation diagram either have a mirror constellation point in the same quadrant mirrored at the $\pi/4$ or $-\pi/4$ axis or lie on the $\pi/4$ or $-\pi/4$ axis,
the constellation points in each quadrant of the constellation diagram are symmetrical to the constellation points in all other quadrant,
at least one signal point within the signal points having same magnitude has an unequal angular distance to the neighbors in direct vicinity in angular domain,
the Euclidean distance between two nearest neighboring constellation points in a quadrant is different for different pairs of nearest neighboring constellation points, and
the distribution of the number of constellation points in a quadrant, sorted by magnitude in increasing order, is (2, 2, 2, 2, 2, 2, 2, 2) or (1, 2, 1, 2, 2, 2, 1, 2, 2, 1) or (1, 2, 1, 2, 2, 1, 2, 2, 2, 1) or (1, 2, 1, 2, 2, 2, 2, 2) or (1, 2, 2, 1, 2, 2, 2, 2, 2).

10. A non-transitory computer-readable recording medium that stores therein a computer program product, which, when executed by a processor, causes the processor to perform the coding and modulation method according to claim 9.

11. A transmission method, comprising:
the coding and modulation method as recited in claim 9 that encodes and modulates input data into constellation values,
converting said constellation values into one or more transmission streams to be transmitted, and
transmitting said one or more transmission streams.

12. A demodulation and decoding method, comprising:
demodulating constellation values of a non-uniform constellation into cell words and to assign bit combinations to constellation values of the non-uniform constellation, and
decoding cell words into output data according to a low density parity check (LDPC) code, wherein
said demodulating is configured to use
i) a first non-uniform constellation comprising 64 constellation points, wherein
the constellation points in each quadrant of the constellation diagram either have a mirror constellation point in the same quadrant mirrored at the $\pi/4$ or $-\pi/4$ axis or lie on the $\pi/4$ or $-\pi/4$ axis, the constellation points in each quadrant of the constellation diagram are symmetrical to the constellation points in all other quadrant, at least one signal point within the signal points having same magnitude has an unequal angular distance to the neighbors in direct vicinity in angular domain, the Euclidean distance between two nearest neighboring constellation points in a quadrant is different for different pairs of nearest neighboring constellation points, and the distribution of the number of constellation points in a quadrant, sorted by magnitude in increasing order, is (2, 2, 2, 2, 2, 2, 2, 2) or (1, 2, 1, 2, 2, 2, 1, 2, 2, 1) or (1, 2, 1, 2, 2, 1, 2, 2, 2, 1) or (1, 2, 1, 2, 2, 2, 2, 2, 2) or (1, 2, 2, 1, 2, 2, 2, 2, 2), or ii) a second non-uniform constellation comprising 64 constellation points, wherein the second non-uniform constellation is obtained through rotation by an angle around an origin, through inversion of bit labels for all constellation points, through interchanging of bit positions, through mirroring on any line in the complex plane or through predistortion for the constellation points, the constellation points in each quadrant of the constellation diagram either have a mirror constellation point in the same quadrant mirrored at the π/4 or −π/4 axis or lie on the π/4 or −π/4 axis, the constellation points in each quadrant of the constellation diagram are symmetrical to the constellation points in all other quadrant, at least one signal point within the signal points having same magnitude has an unequal angular distance to the neighbors in direct vicinity in angular domain, the Euclidean distance between two nearest neighboring constellation points in a quadrant is different for different pairs of nearest neighboring constellation points, and the distribution of the number of constellation points in a quadrant, sorted by magnitude in increasing order, is (2, 2, 2, 2, 2, 2, 2, 2) or (1, 2, 1, 2, 2, 2, 1, 2, 2, 1) or (1, 2, 1, 2, 2, 1, 2, 2, 2, 1) or (1, 2, 1, 2, 2, 2, 2, 2, 2) or (1, 2, 2, 1, 2, 2, 2, 2, 2).

13. A non-transitory computer-readable recording medium that stores therein a computer program product, which, when executed by a processor, causes the processor to perform the decoding and demodulation method according to claim 12.

14. A receiving method comprising:

receiving one or more transmission streams, deconverting one or more transmission streams into said constellation values, and the demodulation and decoding method as recited in claim 12 for demodulating and decoding said constellation values into output data.

* * * * *